United States Patent
Brousseau

(10) Patent No.: US 10,999,664 B2
(45) Date of Patent: May 4, 2021

(54) LOUDSPEAKER ASSEMBLIES AND RELATED METHODS

(71) Applicant: Bose Corporation, Framingham, MA (US)

(72) Inventor: Kevin Joseph Brousseau, Brighton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/215,124

(22) Filed: Dec. 10, 2018

(65) Prior Publication Data

US 2020/0186901 A1 Jun. 11, 2020

(51) Int. Cl.
| | |
|---|---|
| *H04R 1/02* | (2006.01) |
| *F16B 2/18* | (2006.01) |
| *F16M 13/02* | (2006.01) |

(52) U.S. Cl.
CPC ............... *H04R 1/026* (2013.01); *F16B 2/18* (2013.01); *F16M 13/02* (2013.01); *H04R 1/025* (2013.01); *F16M 2200/02* (2013.01); *H04R 2201/021* (2013.01); *H04R 2201/025* (2013.01); *H04R 2201/029* (2013.01)

(58) Field of Classification Search
CPC ........ F16M 11/043; H04R 1/026; H04R 1/02; H04R 1/021; H04R 1/32; H04R 2201/021; H04R 2201/025; H04R 2205/024; A45C 11/20; A45C 15/00; A45C 13/02; A45C 13/1084; A45C 13/18; A45C 13/20; A45C 13/28; A45C 15/06; A45C 15/08; A45C 5/03; A47J 36/10; A47J 36/12

USPC ........... 381/336, 386, 387; 181/199; 403/93; 248/289.11, 292.12

See application file for complete search history.

(56) References Cited

U.S. PATENT DOCUMENTS

| | | | |
|---|---|---|---|
| 5,495,389 A | * 2/1996 | Dewitt | ...................... G06F 1/18 361/679.57 |
| 5,704,578 A | 1/1998 | Fischer | |
| D810,723 S | * 2/2018 | Corten | ......................... D14/214 |
| D841,624 S | * 2/2019 | Nicolas | ........................ D14/214 |

(Continued)

FOREIGN PATENT DOCUMENTS

| | | |
|---|---|---|
| WO | 2009046715 A1 | 4/2009 |
| WO | 2017165920 A1 | 10/2017 |

OTHER PUBLICATIONS

International Search Report and Written Opinion dated Mar. 2, 2020 for PCT/US2019/065467.

*Primary Examiner* — Fan S Tsang
*Assistant Examiner* — Julie X Dang
(74) *Attorney, Agent, or Firm* — Bose Corporation

(57) ABSTRACT

A loudspeaker assembly includes a mounting bracket, a loudspeaker, and a locking mechanism for releasably securing the loudspeaker in a selected one of a plurality of pitch angles relative to the mounting bracket. The mounting bracket includes a mounting plate for securing the mounting bracket to a flat surface, and a support arm extending outwardly from the mounting plate. The loudspeaker includes an electro-acoustic transducer, and an acoustic enclosure defining a bracket passthrough for receiving the support arm of the mounting bracket such the loudspeaker is pivotable between the plurality of pitch angles.

25 Claims, 36 Drawing Sheets

(56) References Cited

U.S. PATENT DOCUMENTS

| | | | |
|---|---|---|---|
| 2005/0072789 A1* | 4/2005 | Einav | E05B 65/5253 |
| | | | 220/756 |
| 2006/0249647 A1 | 11/2006 | Whitehouse et al. | |
| 2007/0075202 A1* | 4/2007 | Gordon | F16M 11/043 |
| | | | 248/289.11 |
| 2008/0031486 A1 | 2/2008 | Petrie | |
| 2008/0099162 A1* | 5/2008 | Ayers | E06B 9/324 |
| | | | 160/178.2 |
| 2009/0019779 A1* | 1/2009 | Nakanishi | E05B 63/185 |
| | | | 49/449 |
| 2011/0305362 A1* | 12/2011 | McGhee | H04R 1/02 |
| | | | 381/386 |
| 2013/0202147 A1 | 8/2013 | Staley et al. | |
| 2013/0251187 A1* | 9/2013 | Sumitani | H04R 1/026 |
| | | | 381/387 |
| 2014/0013789 A1* | 1/2014 | Conrad | A45C 15/00 |
| | | | 62/331 |

\* cited by examiner

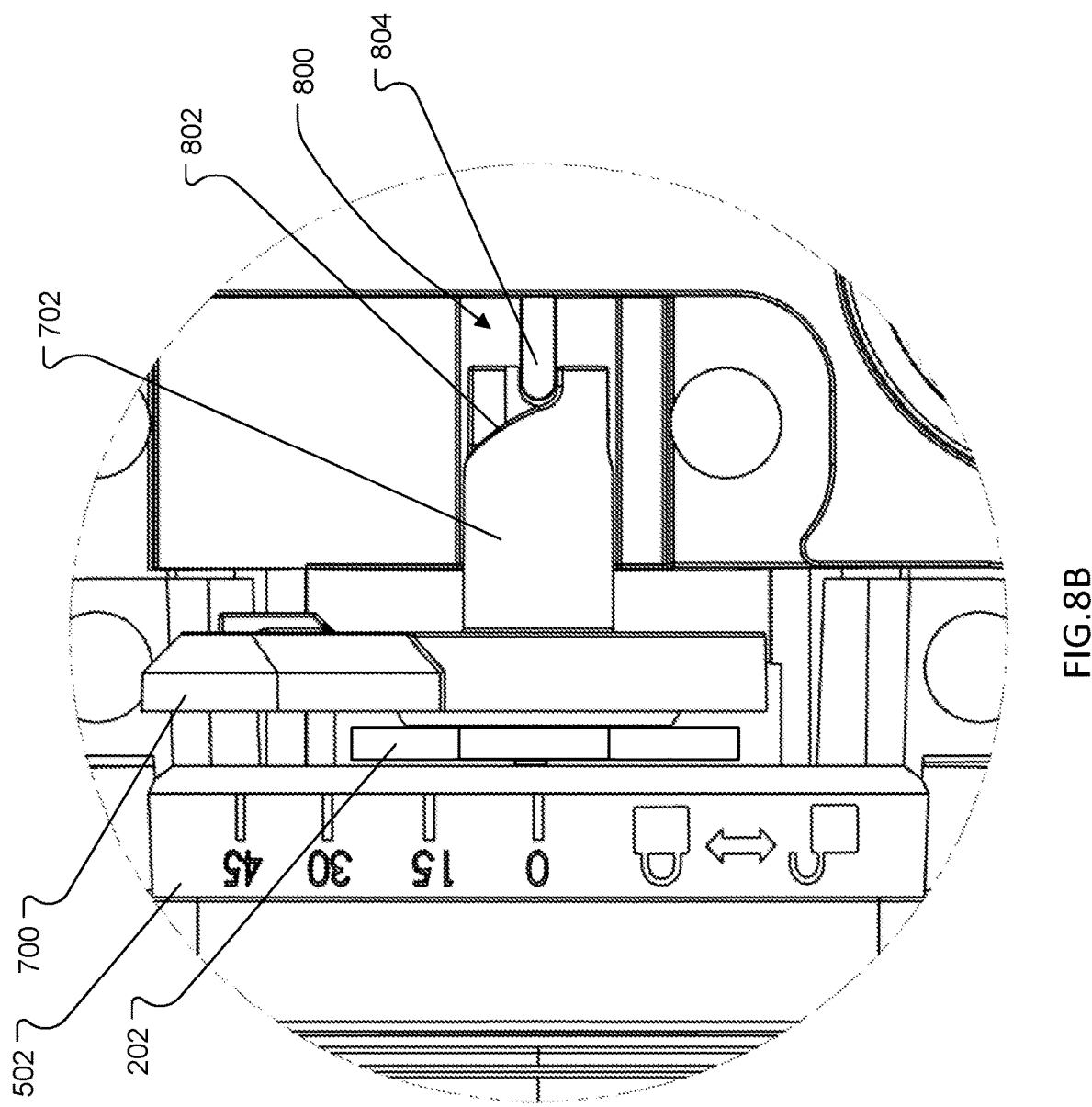

LOUDSPEAKER ASSEMBLIES AND RELATED METHODS

BACKGROUND

This disclosure relates to loudspeaker assemblies and related methods, and, more particularly, to bracket mounted loudspeaker assemblies and related methods.

SUMMARY

All examples and features mentioned below can be combined in any technically possible way.

In one aspect, a loudspeaker assembly includes a mounting bracket, a loudspeaker, and a locking mechanism for releasably securing the loudspeaker in a selected one of a plurality of pitch angles relative to the mounting bracket. The mounting bracket includes a mounting plate for securing the mounting bracket to a flat surface, and a support arm extending outwardly from the mounting plate. The loudspeaker includes an electro-acoustic transducer, and an acoustic enclosure defining a bracket passthrough for receiving the support arm of the mounting bracket such the loudspeaker is pivotable between the plurality of pitch angles.

Implementations may include one of the following features, or any combination thereof.

In some implementations, the support arm includes a pivot pin, and the loudspeaker defines a pin receptacle within the bracket passthrough for receiving the pivot pin such that the loudspeaker pivots, relative to the mounting bracket, about the pivot pin.

In certain implementations, the mounting bracket includes a lock pin extending outwardly from the support arm, and the loudspeaker defines an array of lock features (e.g., lock holes or notches). The loudspeaker is rotatable relative to the mounting bracket between the plurality of pitch angles to align different one of the lock features with the lock pin at each one of the plurality of pitch angles.

In some examples, the locking mechanism is operable to force the lock pin into engagement with a corresponding one of the lock features in the selected one of the pitch angles.

In certain examples, the locking mechanism includes a switch. The switch includes a lever, and a pivot body. The lever is rotatable about a pivot axis of the pivot body between a first, unlocked position in which the loudspeaker is pivotable relative to the mounting and a second, locked position in which movement of the loudspeaker relative to the mounting bracket is inhibited.

In some cases, the loudspeaker includes a cam pin, and the pivot body includes a cam surface that rides along the cam pin such that, as the as the lever is rotated from the unlocked position toward the locked position, the switch is urged toward the support arm, and thereby pushes the lock pin into one of the plurality of lock features to secure the loudspeaker in the selected pitch angle.

In certain cases, the loudspeaker includes a cam feature, and the switch includes a second cam surface that is configured to ride along the cam feature such that, as the lever is rotated from the locked position toward the unlocked position, the switch is urged away from the support arm, thereby disengaging the lock pin from one of the plurality of lock features.

In some implementations, the locking mechanism includes a switch lock that is operable to lock the lever in the locked position.

In certain implementations, the switch includes a latch edge that the switch lock engages to lock the lever in the locked position.

In some examples, the switch lock includes a mounting member coupled to the acoustic enclosure, a spring, and a latch coupled to the mounting member via the spring such that the latch is displaceable relative to the acoustic enclosure. The latch is configured to engage the latch edge of the switch thereby to lock the lever in the locked position.

In certain examples, the latch is displaceable relative to the switch, thereby to disengage the latch edge to permit movement of the lever from the locked position to the unlocked position.

In some cases, the mounting bracket includes a pivot pin that extends outwardly from the support arm, and the bracket passthrough defines a pin alignment slot for accommodating the pivot pin when the support arm is inserted into the bracket passthrough.

In certain cases, the pin alignment slot terminates at a ramp feature, which defines a portion of a pin receptacle. The pivot pin rests in the pin receptacle when the support arm is fully inserted into the bracket passthrough, and the loudspeaker is pivotable about the pivot pin when the pivot pin is received within the pin receptacle. The ramp feature inhibits removal of the support arm from the bracket passthrough once the support arm is fully inserted into the bracket passthrough.

In some implementations, the loudspeaker includes a baffle and a back cover which together defines the acoustic enclosure. The back cover may define the bracket passthrough, and the baffle may define the ramp feature.

In certain implementations, the loudspeaker includes a yoke which cooperates with the ramp feature to define the pin receptacle.

In some examples, the mounting bracket includes a lock pin that extends outwardly from the support arm, and the yoke defines an array of lock features. The loudspeaker is rotatable, about the pivot pin and relative to the mounting bracket, between the plurality of pitch angles to align different one of the lock features with the lock pin at each one of the plurality of pitch angles.

In certain examples, the loudspeaker includes a baffle and a back cover which together defines the acoustic enclosure.

In some cases, the back cover defines the bracket passthrough.

In certain cases, the baffle defines an aperture for receiving and supporting the electro-acoustic transducer.

In some implementations, the loudspeaker includes an acoustically transparent grille, and the baffle includes a magnet for coupling the baffle to the grille.

In certain implementations, the locking mechanism includes a lock pin or surface, and the mounting bracket defines an array of lock features, such as lock holes or notches. The loudspeaker is rotatable relative to the mounting bracket between the plurality of pitch angles to align different ones of the lock features with the lock pin or surface at each one of the plurality of pitch angles, and the locking mechanism is operable to displace the lock pin to engage an aligned one of the lock features, thereby to lock the loudspeaker in one of the plurality of pitch angles.

In some examples, the locking mechanism includes a switch. The switch includes a lever, and a pivot body. The lever is rotatable about a pivot axis of the pivot body between a first, unlocked position in which the loudspeaker is pivotable relative to the mounting and a second, locked position in which movement of the loudspeaker relative to the mounting bracket is inhibited.

In certain examples, the locking mechanism includes a switch. The switch includes a displaceable member. The displaceable member is displaceable between a first, unlocked position in which the loudspeaker is pivotable relative to the mounting bracket and a second, locked position in which movement of the loudspeaker relative to the mounting bracket is inhibited.

Another aspect features a method that includes securing a mounting bracket to a surface and inserting a support arm of the mounting bracket into a bracket passthrough opening defined by an acoustic enclosure of a loudspeaker. The loudspeaker is rotated relative to the support arm to a selected one of a plurality of pitch angles, and a locking mechanism is engaged to releasably secure the loudspeaker in the selected one of the plurality of pitch angles.

Implementations may include one of the above and/or below features, or any combination thereof.

In some implementations, inserting the support arm of the mounting bracket into the bracket passthrough opening includes causing a pivot pin on the support arm to engage a pin receptacle defined by the loudspeaker.

In certain implementations, engaging the locking mechanism includes rotating a lever to cause a lock pin on the support arm to engage one of an array of lock features defined by the loudspeaker.

In some examples, engaging the locking mechanism includes rotating the lever to a lock position and thereby causing a latch to engage a latch edge on the lever, thereby inhibiting further movement of the lever.

In certain examples, engaging the locking mechanism includes displacing a displaceable member to cause a lock pin on the support arm to engage one of an array of lock features defined by the loudspeaker.

Another aspect provides a method that includes displacing a pair of displaceable members affixed to an acoustic enclosure of a loudspeaker from respective locked positions to respective unlocked positions and displacing distal ends of support arms of a mounting bracket towards each other, thereby to disengage a pair of pivot pins on the support arms from respective ones of a pair of pin receptacles defined by the loudspeaker. The loudspeaker is slid away from the mounting bracket along the support arms, thereby decoupling the loudspeaker from the mounting bracket.

Implementations may include one of the above features, or any combination thereof.

BRIEF DESCRIPTION OF THE DRAWINGS

FIG. 8B is a detailed view of the switch, shown disposed within a cavity in a baffle of the loudspeaker assembly, in a locked position.

DETAILED DESCRIPTION

Figure 1A:
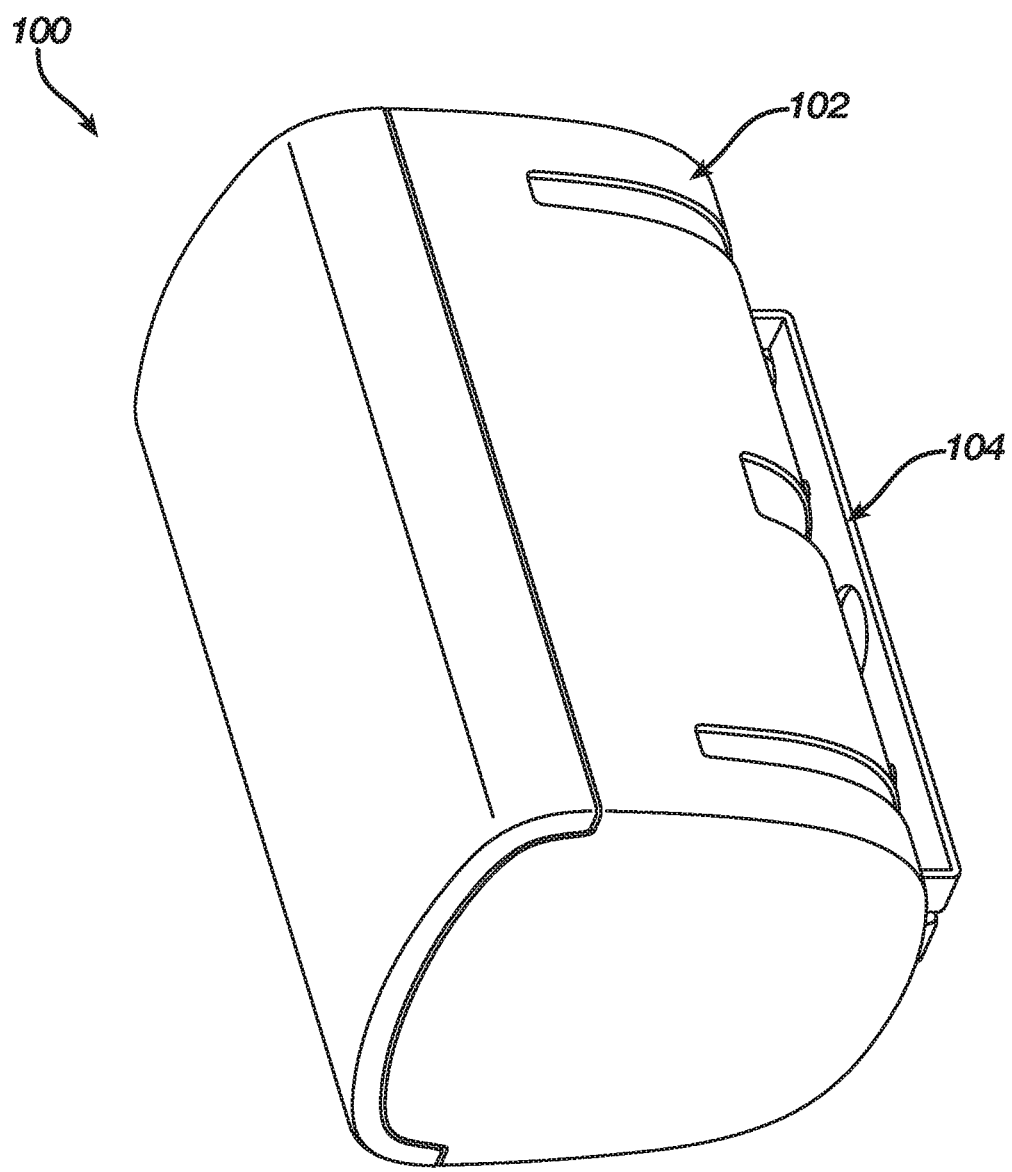
FIG. 1A is perspective view of a loudspeaker assembly as shown from the front, bottom, and left side.
Figure 1B:
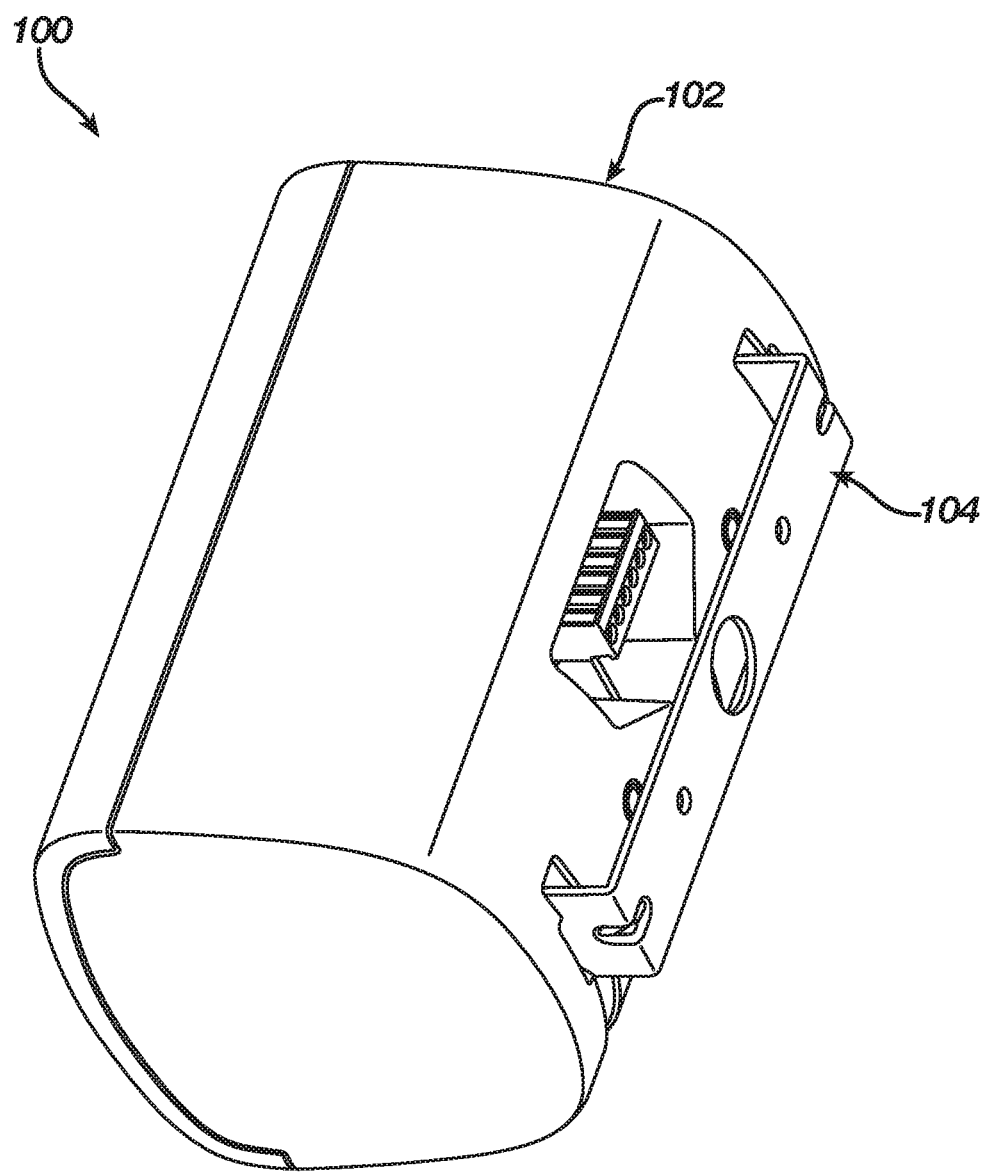
FIG. 1B is perspective view of the loudspeaker assembly of FIG. 1A as shown from the back, top, and right side.

Referring to FIGS. 1A & 1B, a loudspeaker assembly 100 includes a loudspeaker 102 and a mounting bracket 104 for mounting the loudspeaker 102 to a surface (not shown) such as a wall or ceiling. The loudspeaker 102 is rotatably supported by the bracket 104 such that the loudspeaker 102 can be positioned in several orientations relative to the bracket 104.

Figure 2:
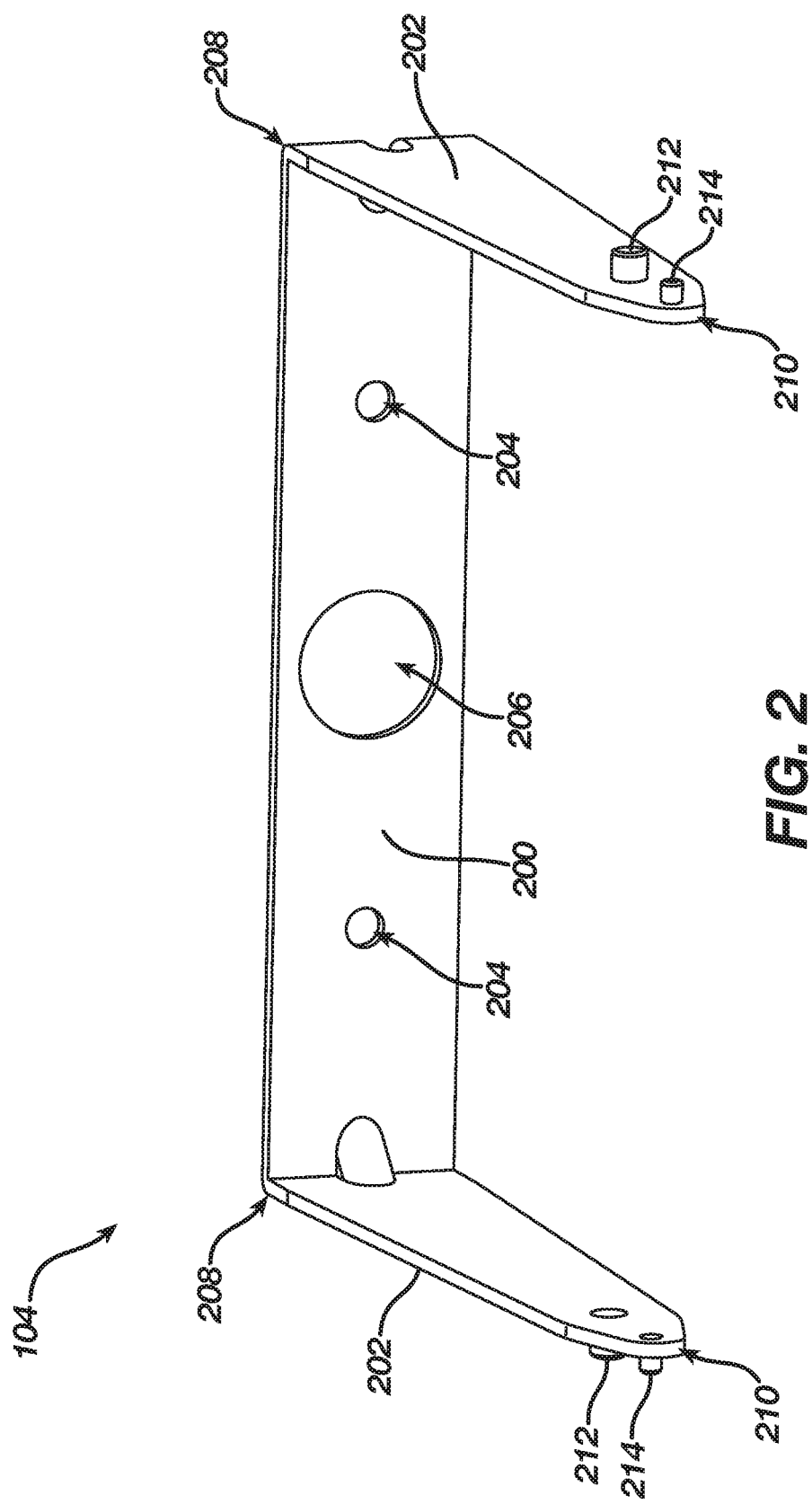
FIG. 2 is a front perspective view of a mounting bracket from the loudspeaker assembly of FIG. 1A.

With reference to FIG. 2, the mounting bracket 104 includes a mounting plate 200 and a pair of support arms 202 for supporting the loudspeaker 102 (FIGS. 1A & 1B). The mounting plate 200 includes a pair of mounting holes 204 for receiving fasteners (e.g., screws) for securing the mounting bracket 104 to a surface such as a wall or ceiling. The mounting plate 200 also includes an opening 206 that allows wiring, i.e., for powering the loudspeaker 102 (FIG. 1), to pass therethrough.

Each of the support arms 202 include a first end 208 that is coupled to the mounting plate 200. And a second, free end 210 opposite the first end 208. Each of the support arms 202 includes a pivot pin 212 and a lock pin 214 proximal to the free end 210. The mounting bracket 104 may be formed from metal.

Figure 3:
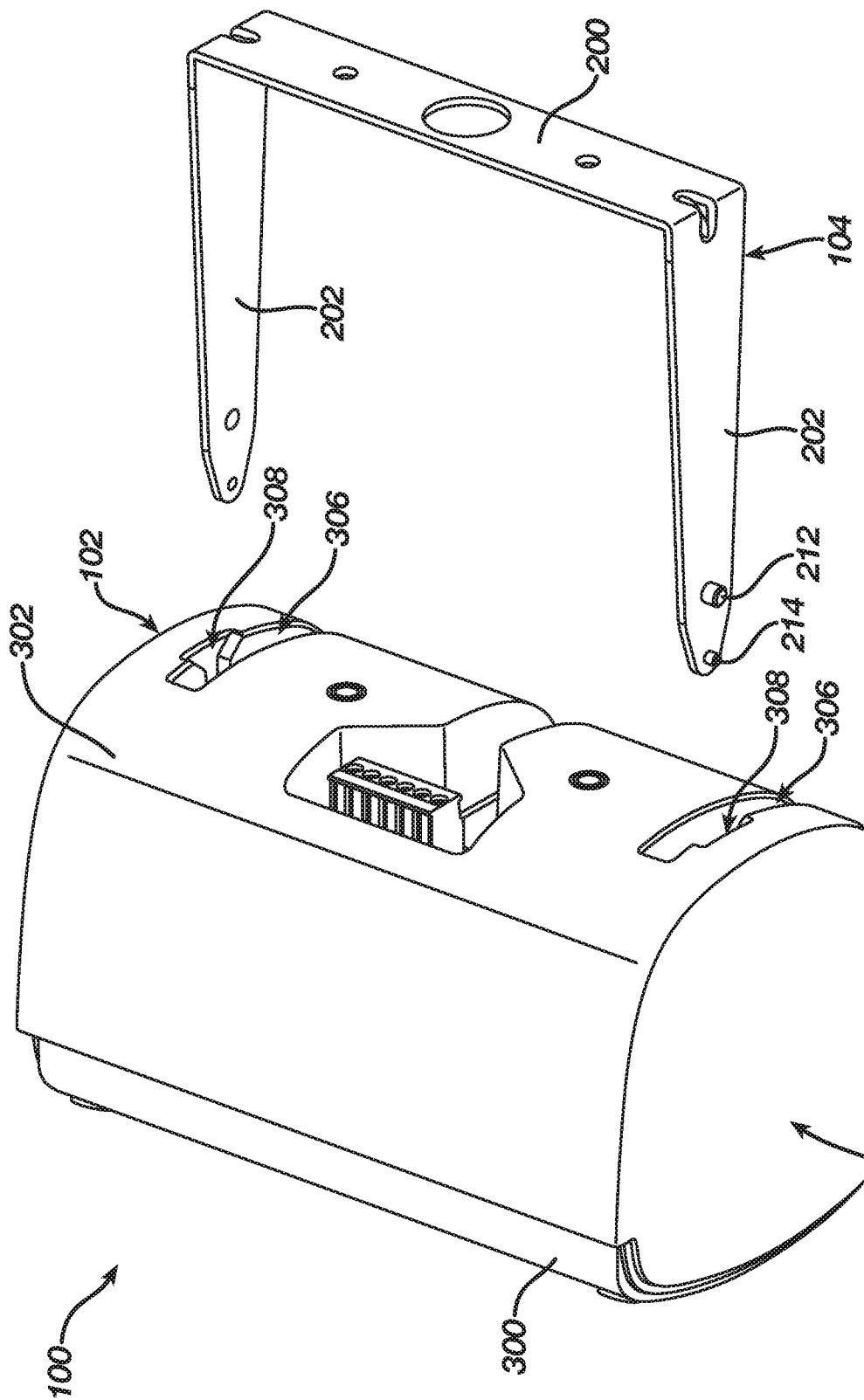
FIG. 3 is an exploded perspective view of the loudspeaker assembly of FIG. 1A as shown from the back, top, and right side.

Referring to FIG. 3, the loudspeaker 102 includes a baffle 300 and a back cover 302 that together define an acoustic enclosure 304. The back cover 302 defines a pair bracket passthroughs 306 for receiving the support arms 202. Each of the passthroughs 306 defines a corresponding pin alignment slot 308 for accommodating the pivot and lock pins 212, 214 during insertion of the support arms 202. With reference to FIGS. 4A through 4D, each of the pin alignment slots 308 includes a tapered wall that terminates at a ramp feature 400, which defines a portion of a pin receptacle 402 for a receiving a corresponding one of the pivot pins 212. In the illustrated example, the ramp features 400 are defined by, e.g., integrally molded in, the baffle 300 (FIG. 3).

Figure 4A:
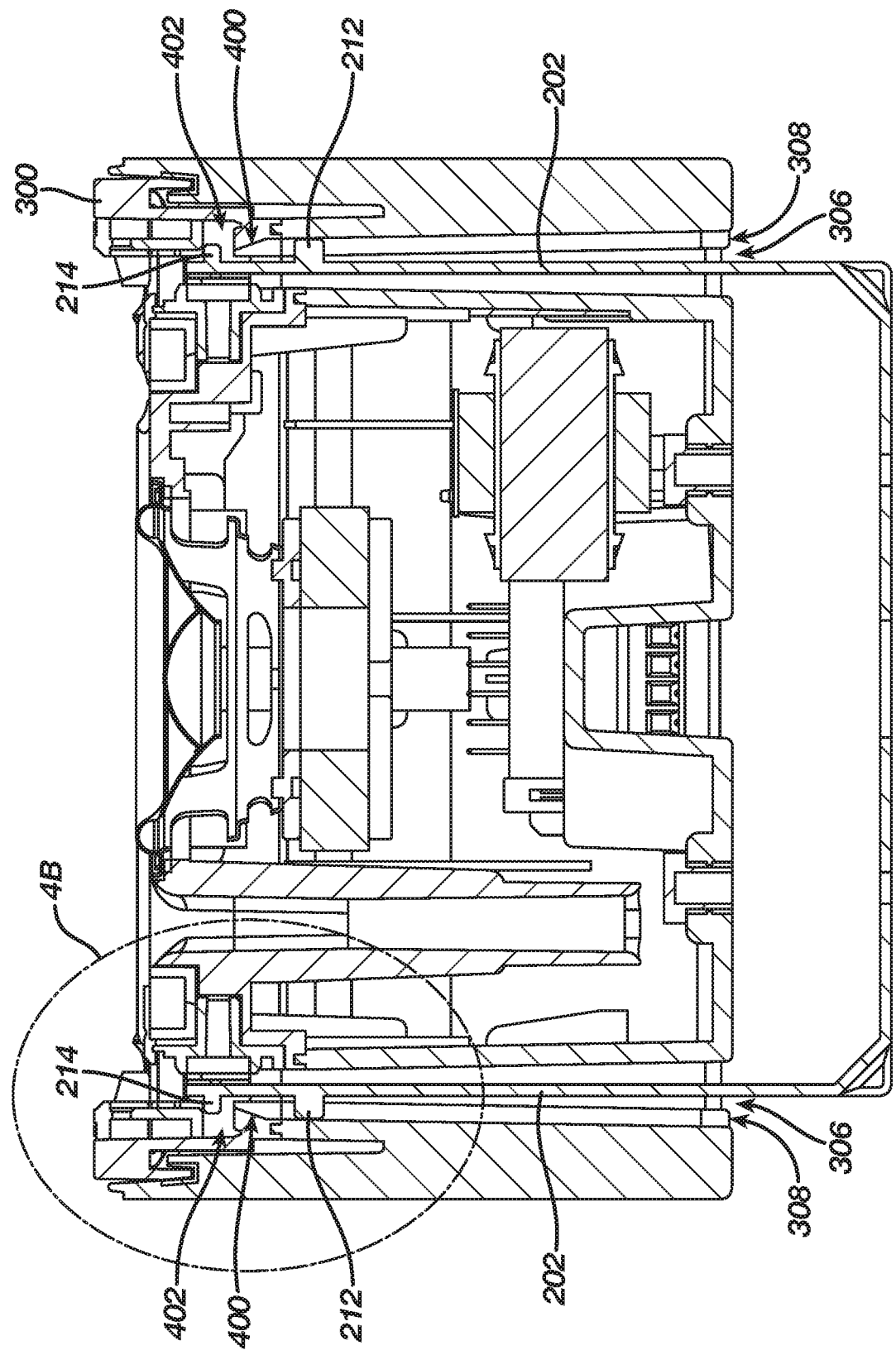
FIG. 4A is cross-sectional top view of the loudspeaker assembly of FIG. 1A showing a pair of support arms of a mounting bracket partially inserted into a pair of bracket passthrough openings defined by the loudspeaker.
Figure 4B:
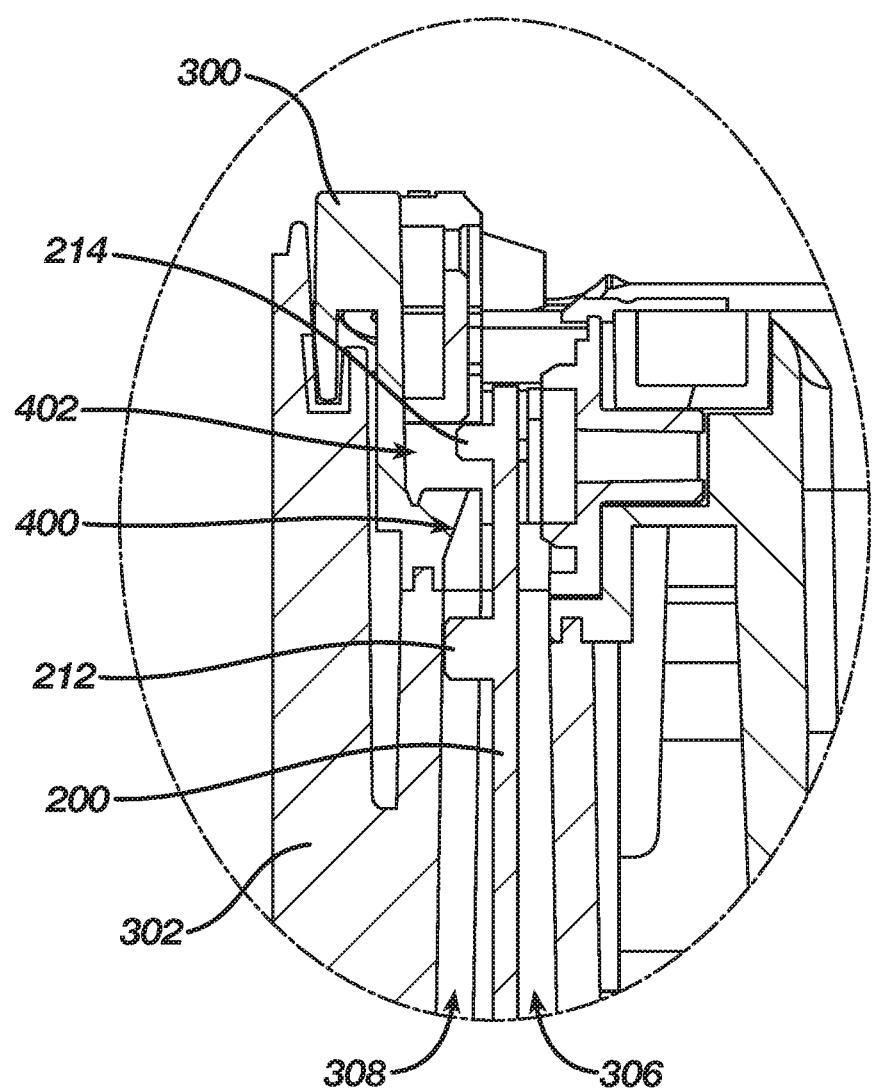
FIG. 4B is a detailed sectional top view from FIG. 4A.
Figure 4C:
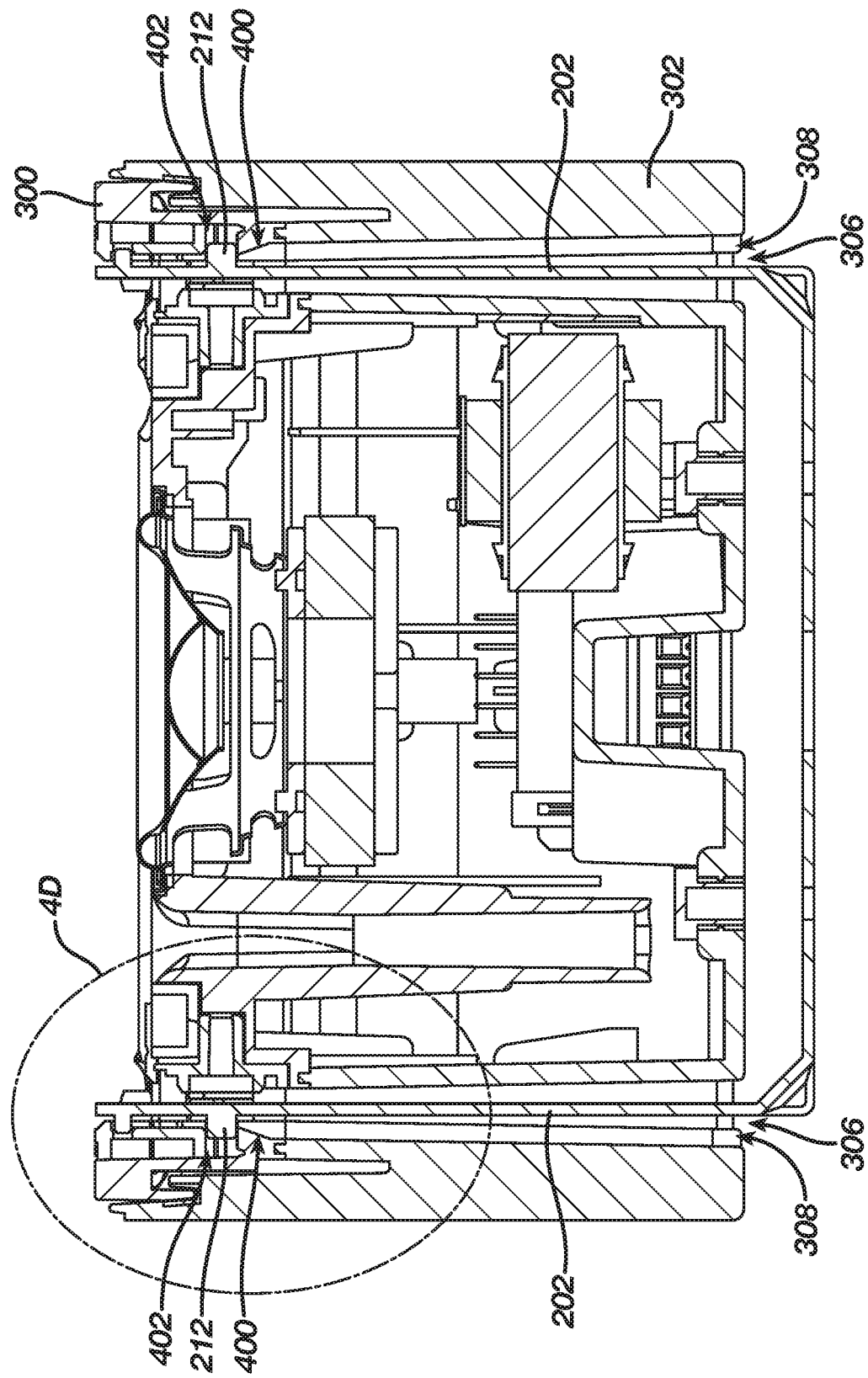
FIG. 4C is cross-sectional top view of the loudspeaker assembly of FIG. 1A showing the pair of support arms of the mounting bracket fully inserted into the pair of bracket passthrough openings defined by the loudspeaker.
Figure 4D:
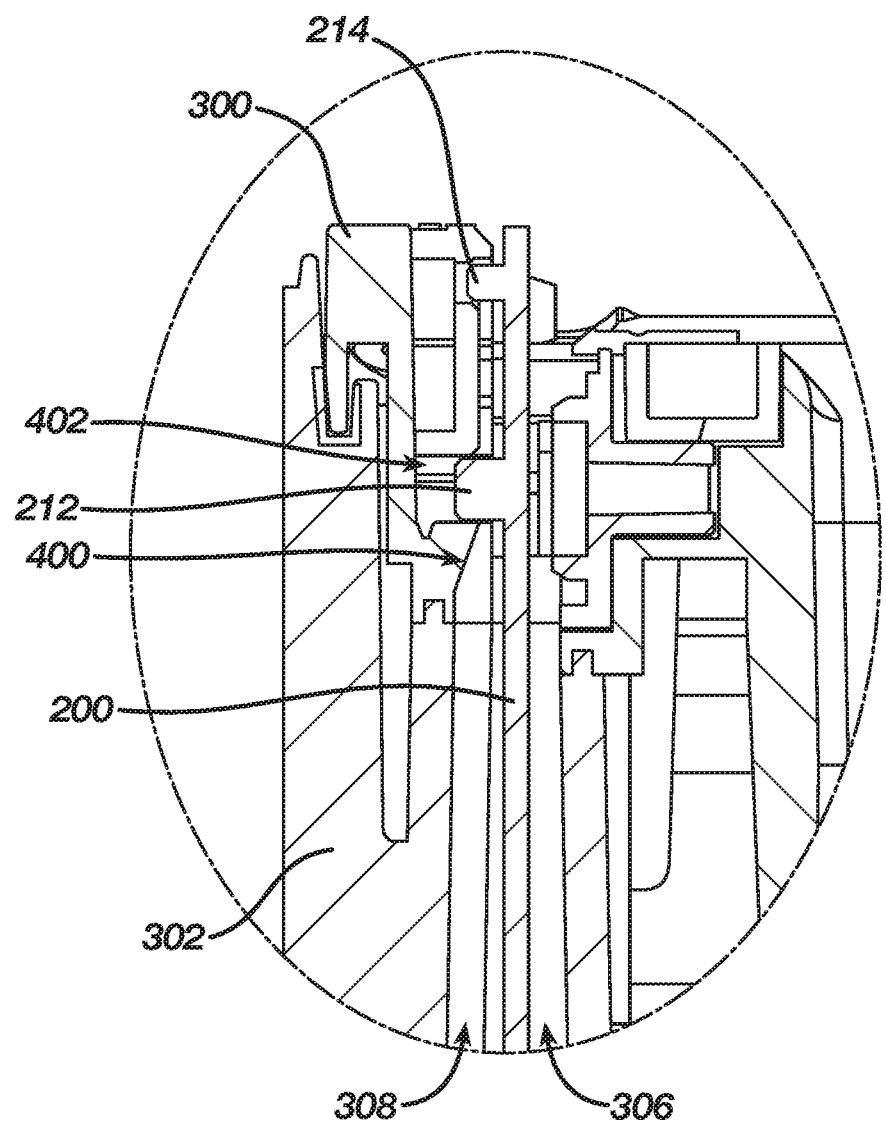
FIG. 4D is a detailed sectional top view from FIG. 4C.

During assembly, the support arms 202 are inserted in the bracket passthroughs 306 with their pivot pins 212 aligned with corresponding ones of the pin alignment slots 308, as shown in FIGS. 4A through 4D. As the loudspeaker 102 is moved along the support arms 202, the pivot pins 212, guided by the tapered walls of the pin alignment slots 308, will ride up the ramp features 400 and snap into place in the pin receptacles 402, as shown in FIGS. 4C & 4D. Once the pivot pins 212 are engaged in the pin receptacles 402, the support arms 202 will be unable to travel any further toward the front surface of baffle 300. In this position, the support arms 202 can only be removed from the loudspeaker 102 by displacing the free ends of the arms 202 towards each other to disengage the pivot pins 212 from the pin receptacles 402.

With the pivot pins 212 snapped in place in the pin receptacles 402, the loudspeaker 102 can pivot about the pivot pins 212. The range of motion is determined, in part, by the dimension of the bracket passthroughs 306 (FIG. 3). In the illustrated implementation, the loudspeaker 102 is rotatable over a 45-degree angle relative to the support arms 202.

Figure 5:
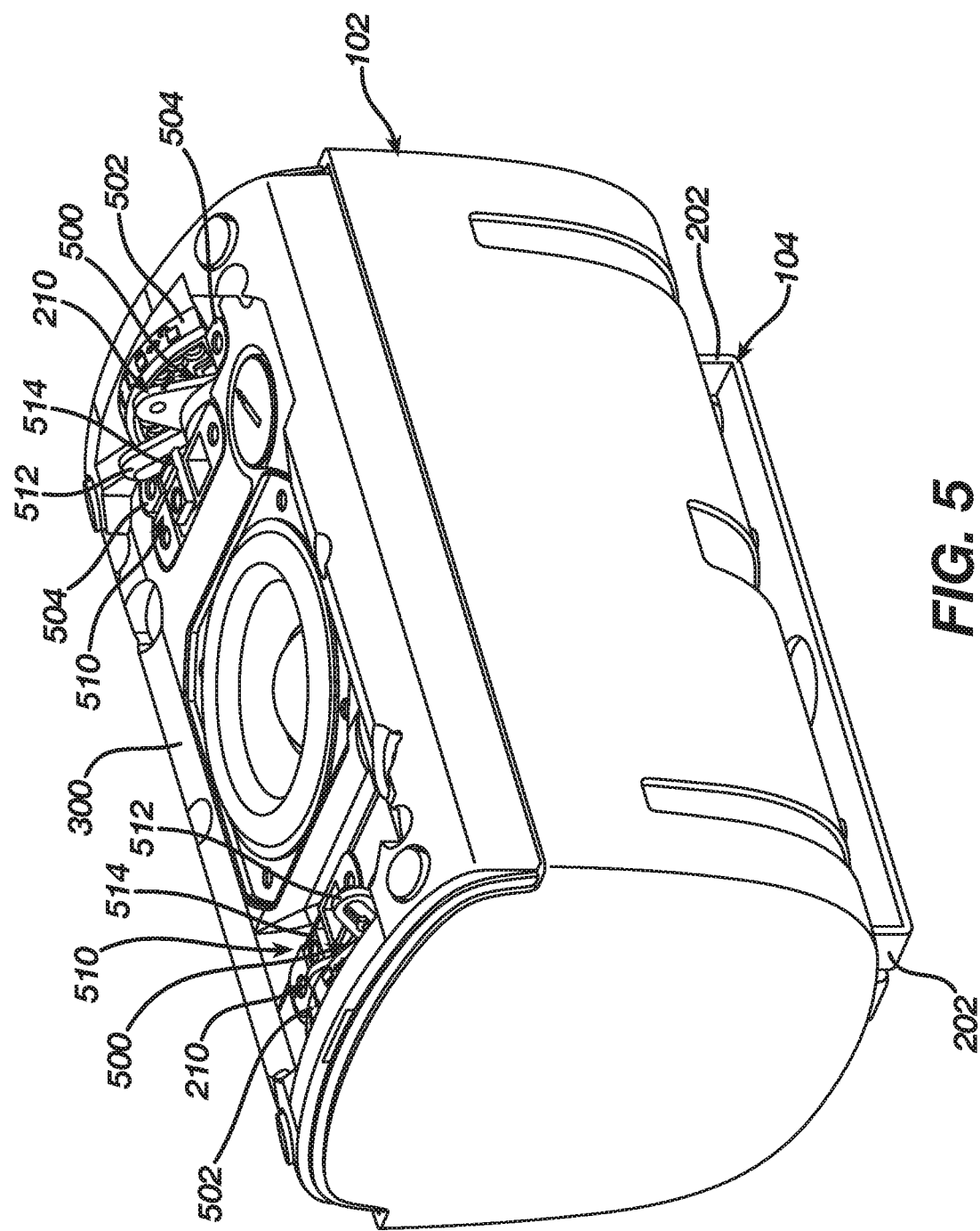
FIG. 5 is a perspective view of the loudspeaker assembly of FIG. 1A with the grille removed.

As shown in FIG. 5, the baffle 300 defines a pair of openings 500 within which the ramp features 400 (FIGS. 4A-4D) are disposed. The openings 500 accommodate the free ends 210 of the support arms 202 and are dimensioned to enable the rotation of the loudspeaker 102 relative to the mounting bracket 104. A yoke 502 is mounted within each of the openings 500. In that regard, each yoke 502 includes a pair of mounting tabs 504 (two shown in FIG. 5), which are received within corresponding recesses formed in the baffle 300 and are secured in place, e.g., with fasteners.

Figure 6:
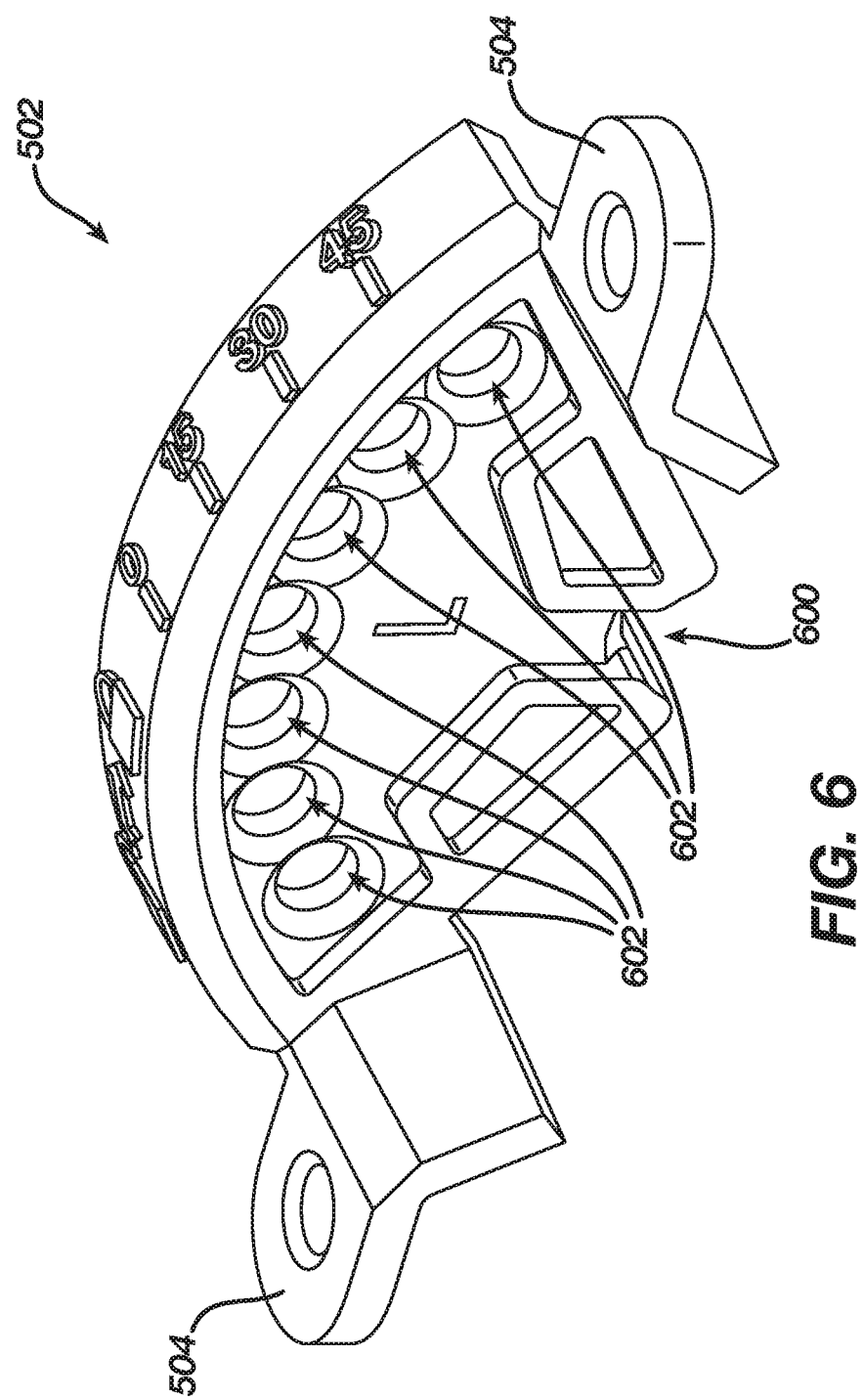
FIG. 6 is a perspective view of a yoke from the loudspeaker assembly of FIG. 1A.

Referring to FIG. 6, each of the yokes 502 include a first end 600, which, together with a corresponding one of the ramp features 400, defines one of the pin receptacles 402 (FIGS. 4A-4D). A second, opposite end of each yoke 502 defines an array of locking holes 602 for receiving a corresponding one of the lock pins 214 (FIG. 2). Depending on the orientation of the loudspeaker 102 relative to the mounting bracket 104, the lock pins 214 engage different ones of the locking holes 602. The illustrated configuration allows the loudspeaker 102 the be positioned between a 0-degree position and a 45 degree position in 15 degree increments. As shown in FIG. 6, in some implementations a visible surface of the yoke(s) 502 may be embossed with, or have printed thereon, angle markers to provide the user with a visual indication of the angle of orientation of the loudspeaker 102.

In the illustrated implementation, the loudspeaker 102 also includes a pair of locking mechanisms 510 (FIG. 5). Each locking mechanism 510 includes a switch 512 and a switch lock 514. Once the loudspeaker 102 is oriented at the desired pitch, the user can actuate the locking mechanisms 510 to hold it in place. The locking mechanisms 510 will both lock the pitch angle and secure the mounting bracket 104 in the loudspeaker 102 by pushing the lock pins 214 deeper into the locking holes 602 (FIG. 6).

Figure 7:
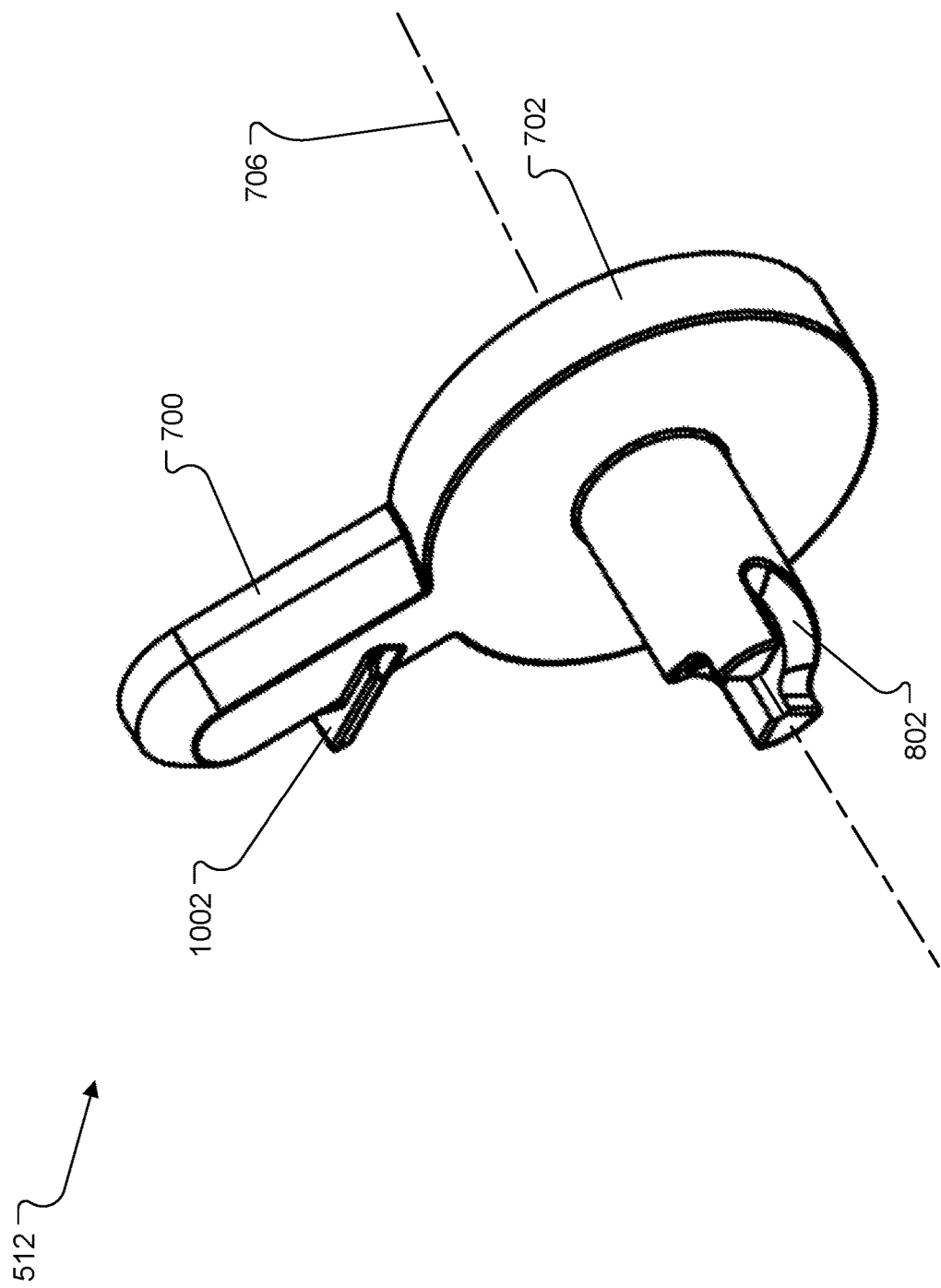
FIG. 7 is a perspective view of a switch from the loudspeaker assembly of FIG. 1A.
Figure 8A:
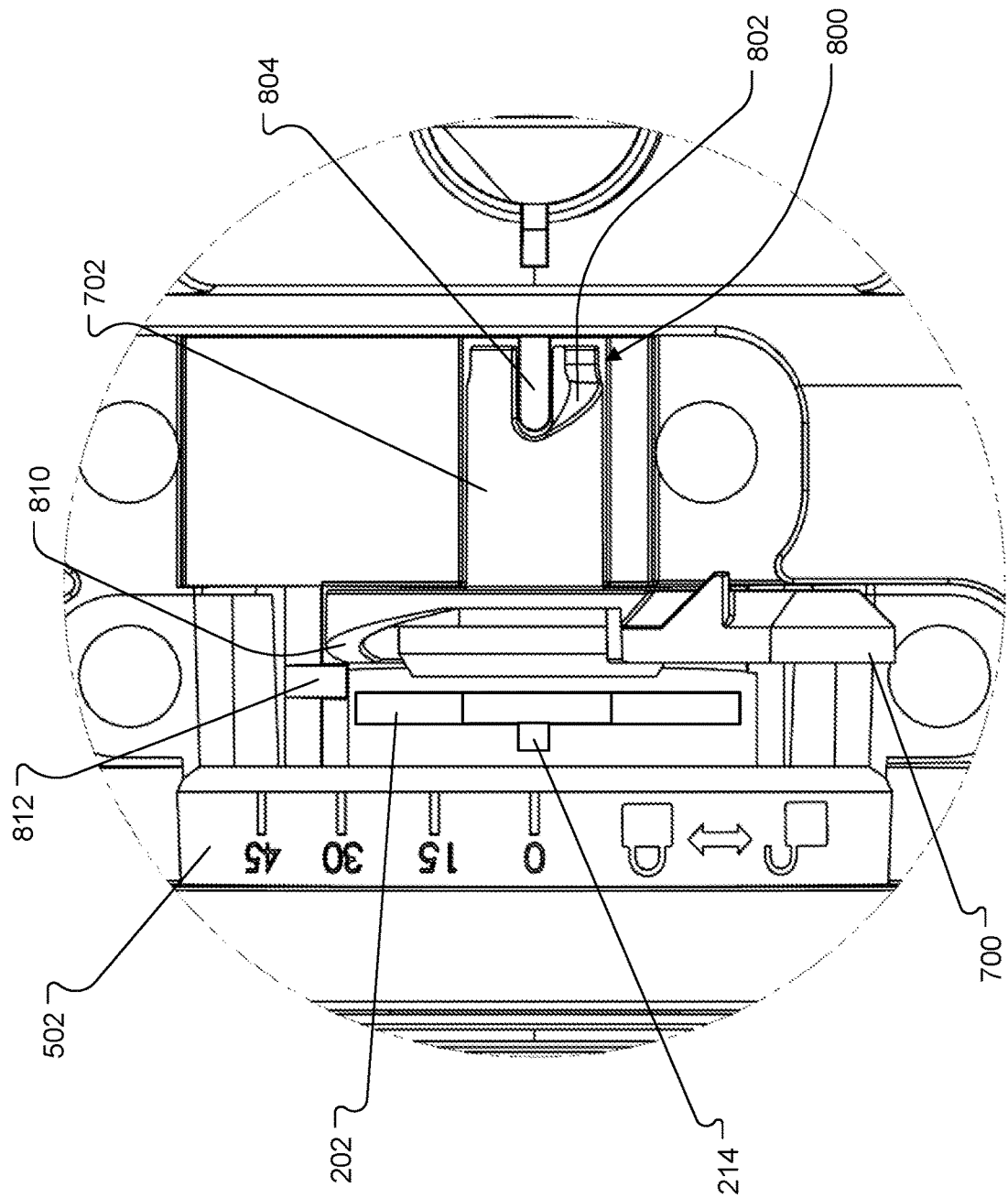
FIG. 8A is a detailed view of the switch, shown disposed within a cavity in a baffle of the loudspeaker assembly, in an unlocked position.

Each switch 512 resides within one of the openings 500 in the baffle 300 such that the corresponding support arm 202 is disposed between the switch 512 and the corresponding yoke 502. Referring to FIG. 7, each switch 512 includes a lever 700 and a pivot body 702. As shown in FIGS. 8A & 8B, the pivot body 702 is rotationally received within a cavity 800 defined by the baffle 300. The pivot body 702 includes a cam surface 802 which engages a cam pin 804 disposed with the cavity 800. FIGS. 8A & 8B are shown with the switch lock 514 (FIG. 5) removed to allow the cam surface 802 and the cam pin 804 to be visible; i.e., in the illustrated embodiment, the cam surface 802 and cam pin 804 are positioned beneath and covered by the switch lock 514 (FIG. 5). As the lever 700 is displaced (e.g., over an angle of 90 degrees) from an unlocked position, FIG. 8A, to a locked position, FIG. 8B, the pivot body 702 rotates about its pivot axis 706 (FIG. 7). As the pivot body 702 rotates from the unlocked to the locked position, the cam surface 802 rides along the tip of the cam pin 804 and the pivot body 702 is urged toward the corresponding support arm 202, and thereby pushing the lock pin 214 (FIGS. 2 & 8A) further into one of the lock holes 602 (FIG. 6) in the corresponding yoke 502.

Figure 9:
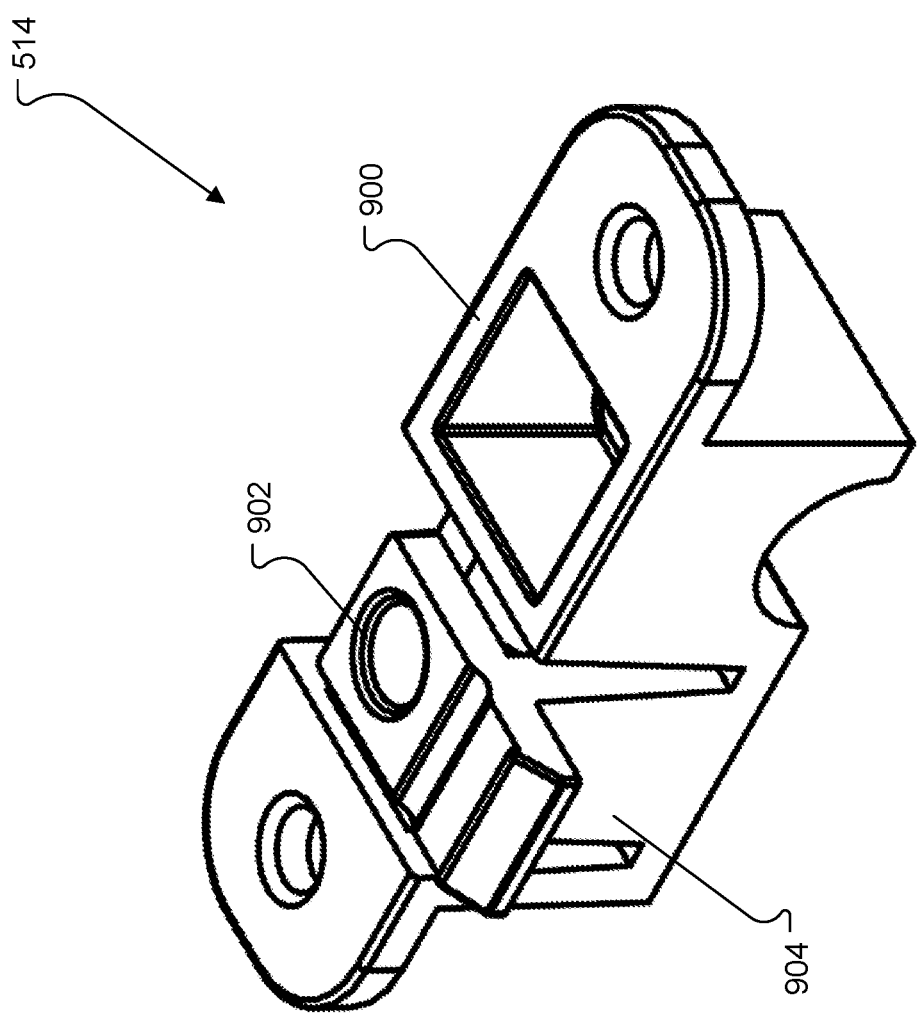
FIG. 9 is a perspective view of a switch lock from the loudspeaker assembly of FIG. 1A.
Figure 10A:
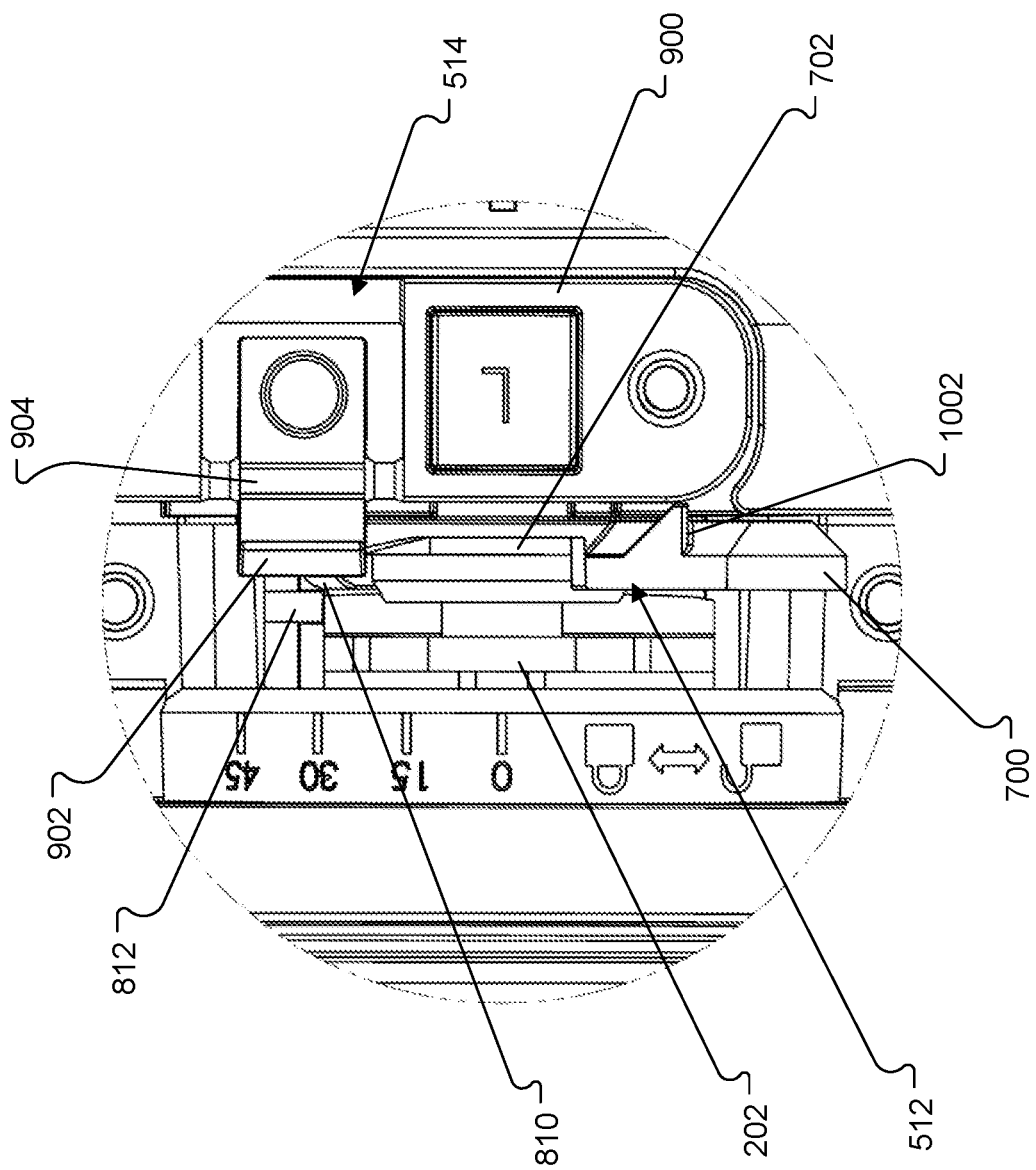
FIG. 10A is a detailed view of the switch lock of FIG. 9 disengaged from the switch, with the switch shown in an unlocked position.
Figure 10B:
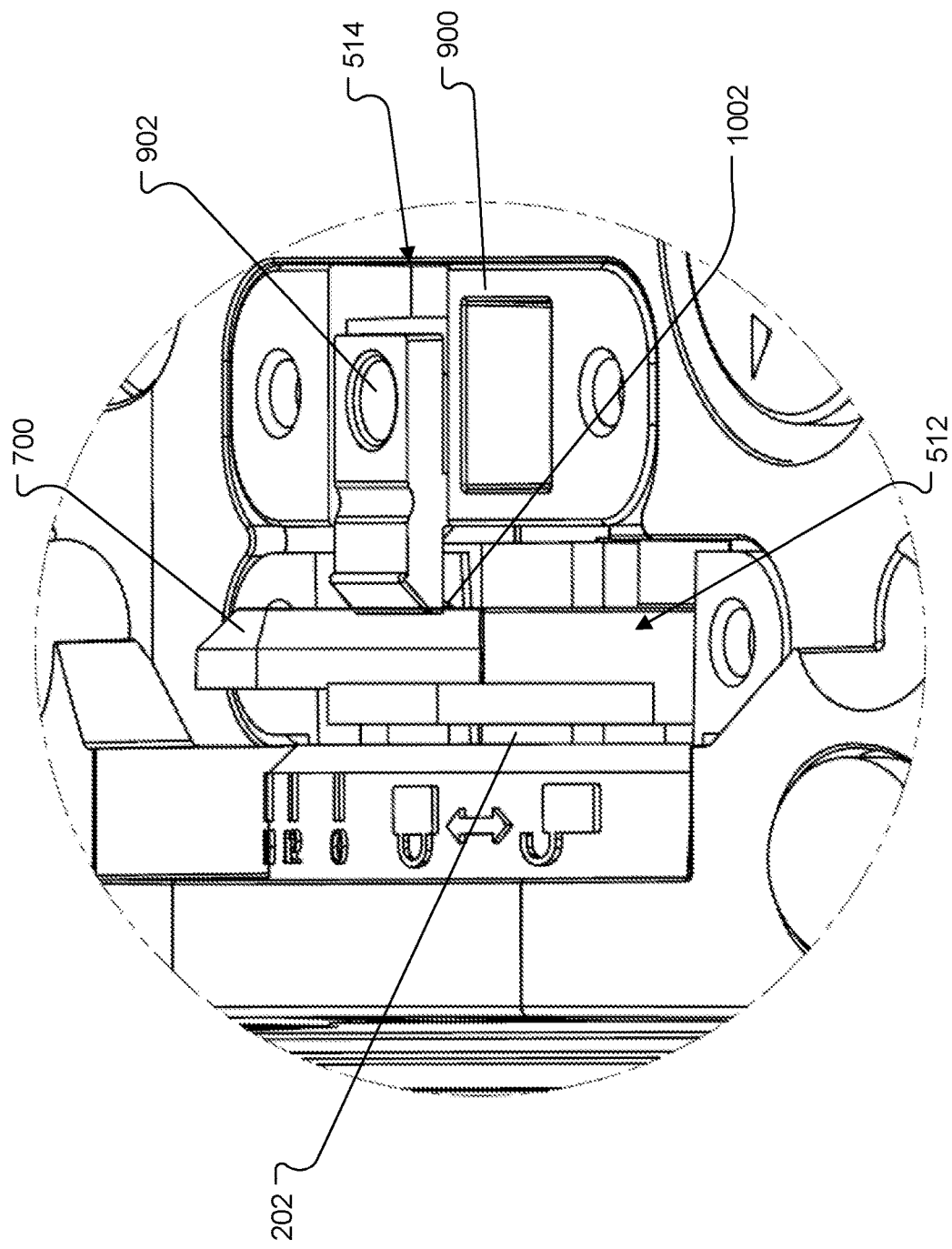
FIG. 10B is a detailed view of the switch lock engaged with the switch, with the switch shown in a locked position.

Once the switch 512 is in the locked position, the switch lock 514 is engaged to hold the switch 512 in place. Referring to FIG. 9, each switch lock 514 includes a mounting member 900 and a latch 902 that is coupled to the mounting member 900 via a spring 904. With reference to FIGS. 10A & 10B, the mounting member 900 is mounted (e.g., via fasteners) in a recess in the baffle 300 thereby coupling the switch lock 514 to the baffle 300 and enclosing the pivot body 702 of the switch in the cavity 800 (FIGS. 8A & 8B). The spring 904 biases the latch 902 outwardly away from the mounting member 900 to engage a latch edge 1002 (see also FIG. 7) on a corresponding one of the levers 700 when the lever 700 is rotated to the locked position. The baffle, back cover, yoke, switch and switch lock may be formed from molded plastic.

The loudspeaker 102 can be reoriented or removed from the mounting bracket 104 by pressing on the latch 902 to displace it towards its associated mounting member 900 to release the lever 700, the lever 700 can then be rotated back to the unlocked position (FIG. 10A). The support arms 202 may be biased slightly inwards, such that, as the lever 700 is rotated towards the unlocked position, the support arms 202 push on the switch 512 to keep the cam surface 802 engaged with the cam pin 804. Alternatively or additionally, a surface of the switch 512 opposite the pivot body 702 can be provided with a second cam surface 810 (see also FIG. 8A) that is configured to ride along a cam feature 812 (e.g., a second cam pin, FIG. 8A) on the baffle 300 or yoke 502 to move the switch 512 away from the corresponding support arm 202 as it is displaced toward the unlocked position. Once in the unlocked position, the loudspeaker 102 can be rotated relative to the mounting bracket 104 to change the pitch angle, or, to remove the loudspeaker 102, the free ends 210 (FIG. 2) of the support arms 202 can be pressed towards each other to disengage the pivot pins 212 from pin receptacles 402, and then the loudspeaker 102 can be pulled away from the mounting bracket 104.

Figure 11:
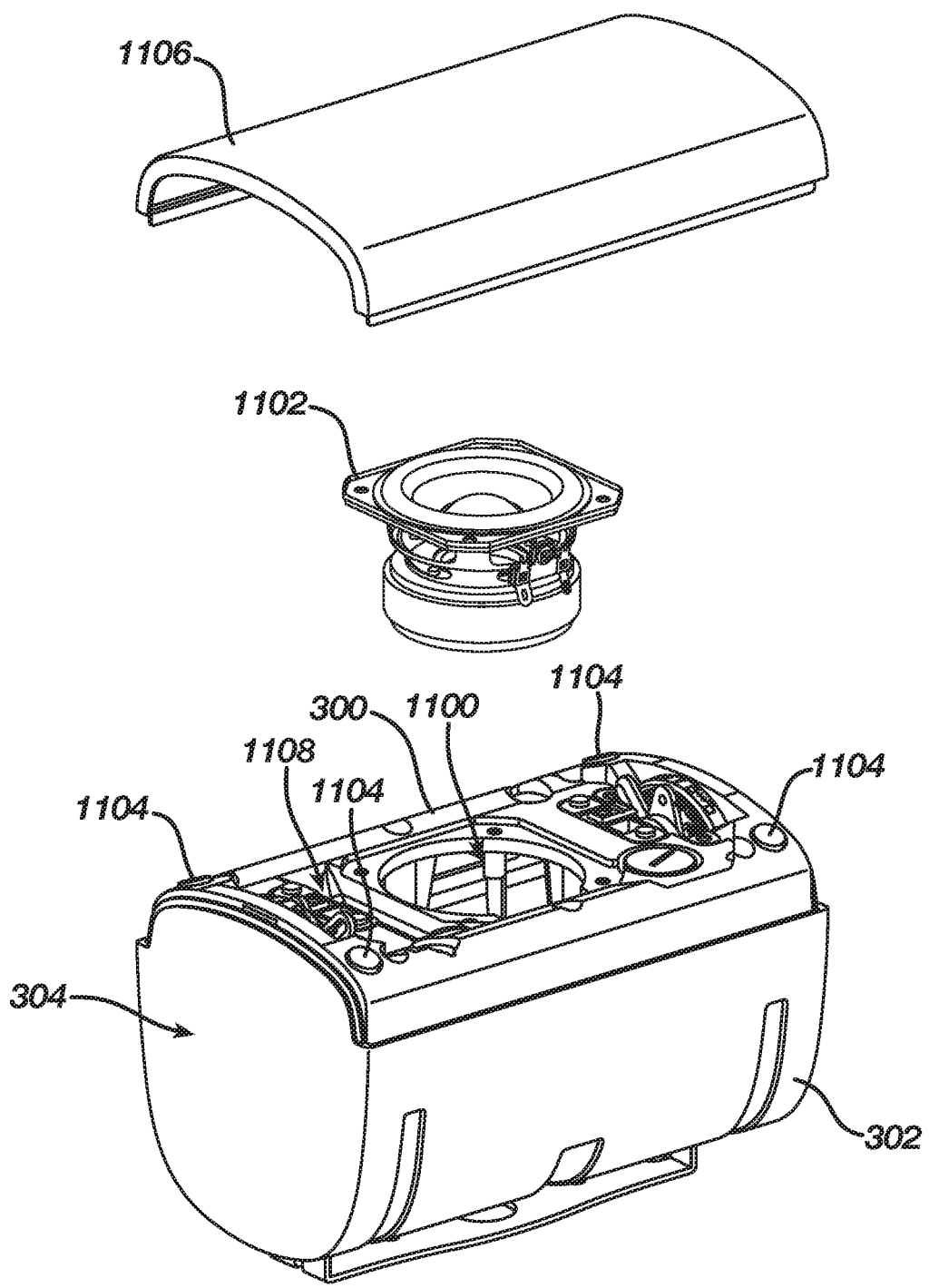
FIG. 11 is an exploded perspective view of the loudspeaker assembly of FIG. 1 showing an electro-acoustic transducer and grille removed from the loudspeaker.

Referring to FIG. 11, the baffle 300 also defines an aperture 1100 for receiving an electro-acoustic transducer 1102. The electro-acoustic transducer 1102 is mounted to the baffle 300 such that a rear radiating surface of the transducer radiates acoustic energy into the acoustic enclosure 304 defined by baffle 300 and the back cover 302. A front radiating surface of the electro-acoustic transducer 1102 radiates acoustic energy outwardly, away from the acoustic enclosure 304.

A plurality of magnets 1104 are disposed along an outer surface of the baffle 300. The magnets 1104 enable attachment of an acoustically transparent loudspeaker grille 1106. The grille 1106 may be made of metal and/or may be provided with magnets to help enable attachment to the baffle 300. As shown in FIG. 11, the baffle 300 may also define an acoustic port 1108 that is acoustically coupled to the acoustic enclosure 304.

Other Implementations

While an implementation has been described in which the support arms are provide with lock pins and the yokes are provided with an array of lock holes, in other implementations each of the support arms may be provided with a lock hole and each of the yokes may define an array of lock pins for engaging the lock holes in the support arms.

Furthermore, while lock "holes" are described and shown, other implementations may make use of other lock features, such as notches, for the lock pins to engage with.

While some implementations employ lock holes in the yokes for the lock pins on the support arms to engage with, in some implementations, the yokes may provide a smooth surface for the lock pins, or other features on the support arms, to frictionally engage with. In some instances, the lock pins can be rubberized to assist in forming a frictional engagement with a surface of the yoke.

In some implementations, only a single lock mechanism may be necessary. In which case, only one of support arms may include a lock pin for working cooperative with the lock mechanism. Such implementations may only use a single yoke.

Figure 12A:
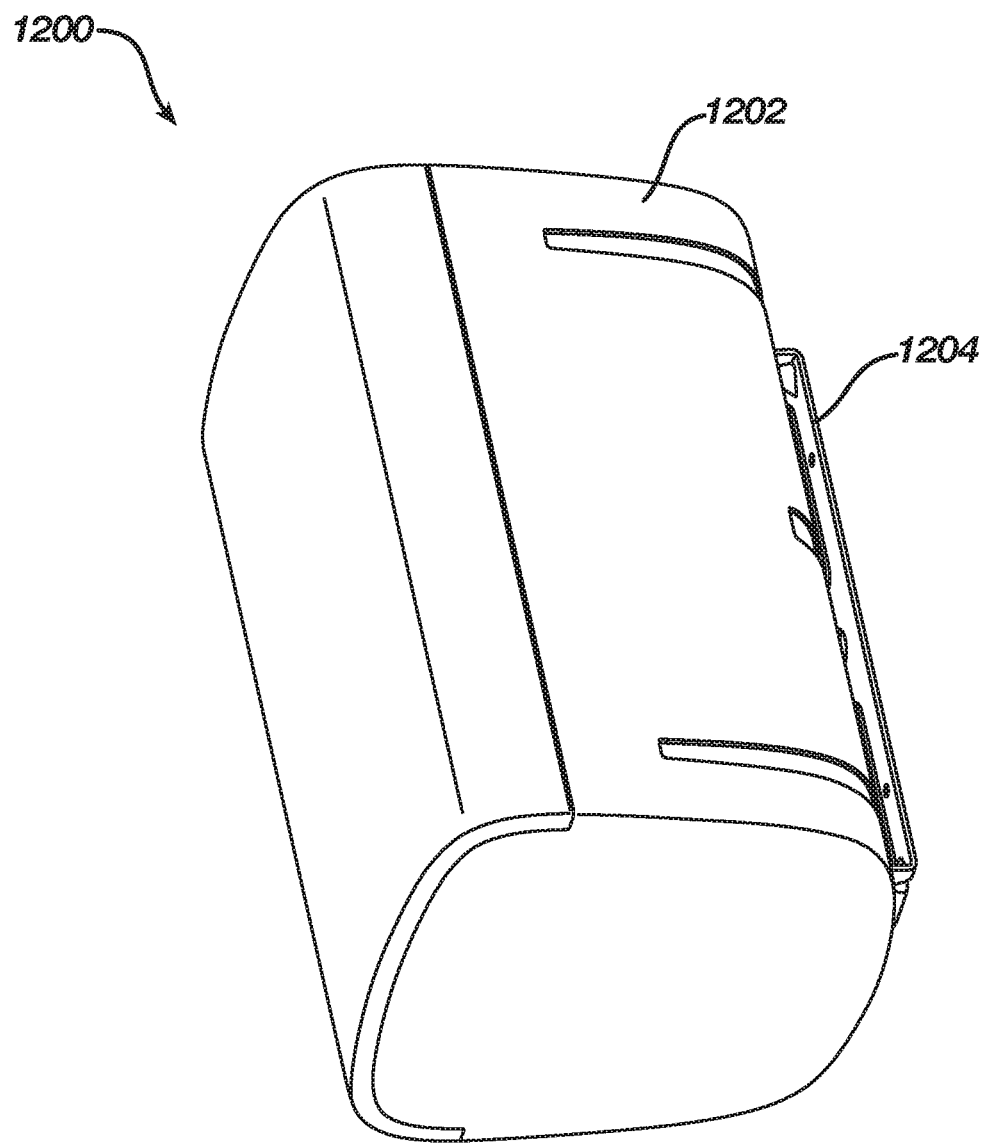
FIG. 12A is perspective view of another implementation of a loudspeaker assembly as shown from the front, bottom, and left side.
Figure 12B:
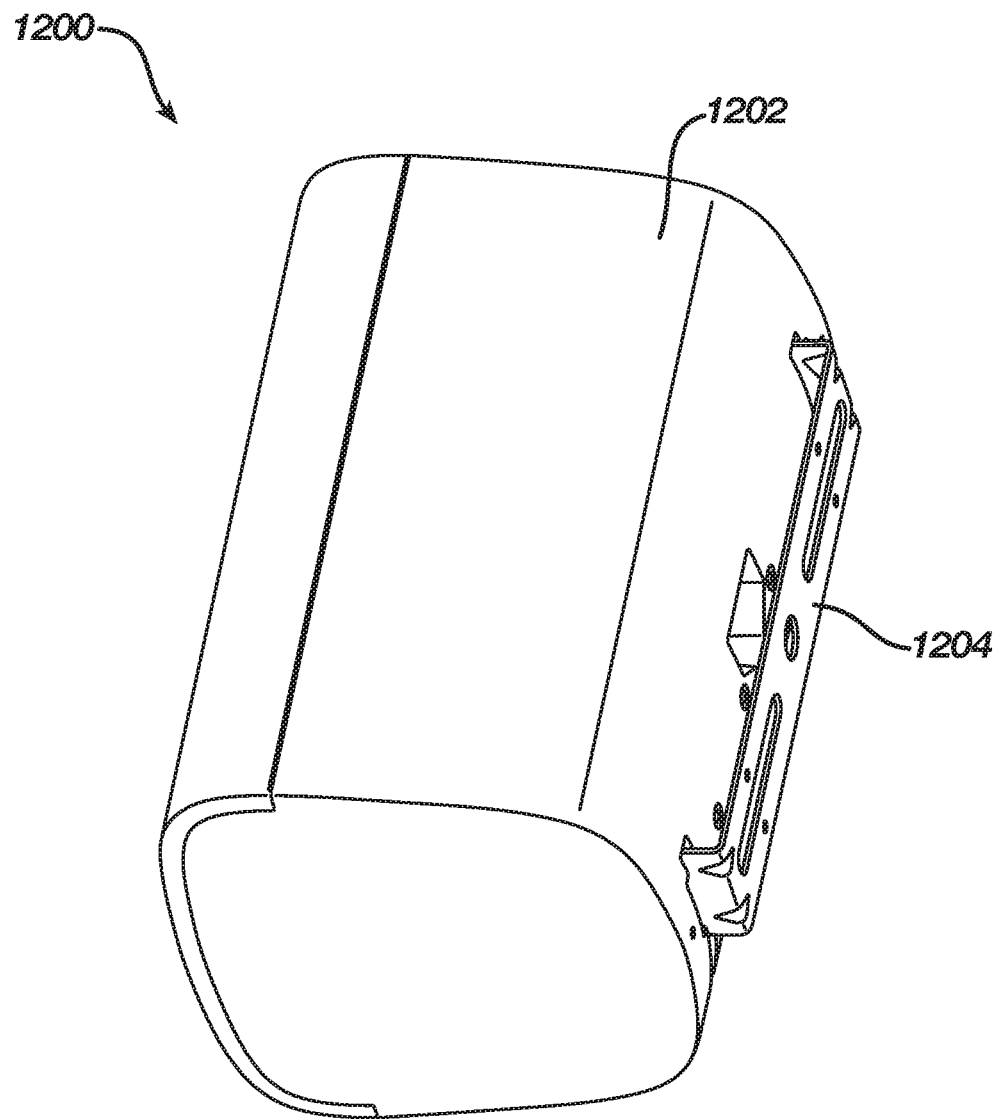
FIG. 12B is perspective view of the loudspeaker assembly of FIG. 12A as shown from the back, top, and right side.

In still other embodiments, the free ends of the support arms may define respective arrays of lock holes (or another form of lock features) and a lock pin may be mounted to the loudspeaker for engaging the lock holes in the support arms. For example, FIGS. 12A & 12B illustrate another loudspeaker assembly 1200 that includes a loudspeaker 1202 and a mounting bracket 1204 for mounting the loudspeaker 1202. The loudspeaker 1202 is rotatably supported by the bracket 1204 such that the loudspeaker 1202 can be positioned in several orientations relative to the bracket 1204.

Figure 13:
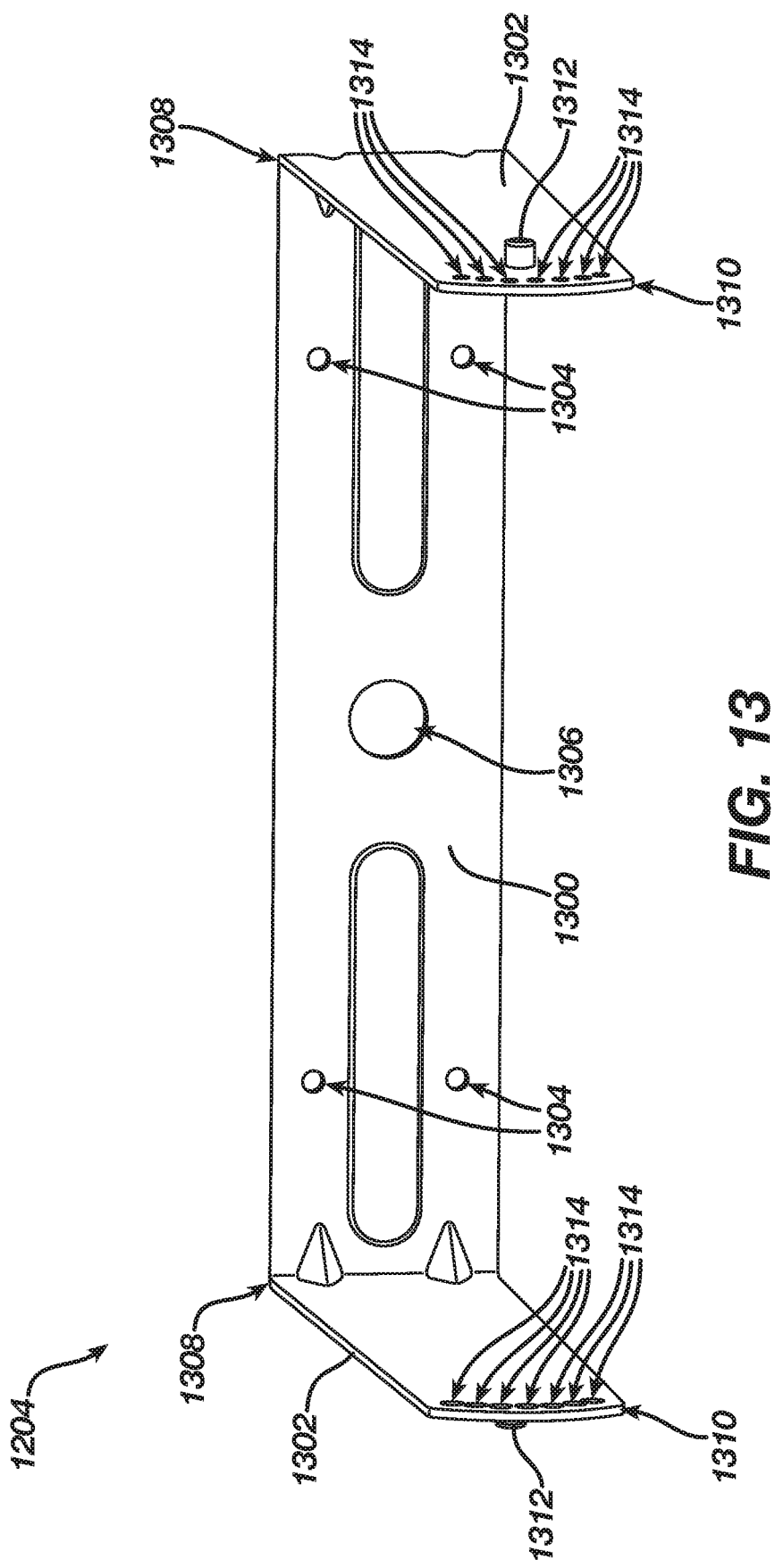
FIG. 13 is a front perspective view of a mounting bracket from the loudspeaker assembly of FIG. 12A.

With reference to FIG. 13, the mounting bracket 1204 includes a mounting plate 1300 and a pair of support arms 1302 for supporting the loudspeaker 1202 (FIGS. 12A & 12B). The mounting plate 1300 includes a set of mounting holes 1304 for receiving fasteners (e.g., screws) for securing the mounting bracket 1204 to a surface such as a wall or ceiling. The mounting plate 1300 also includes an opening 1306 that allows wiring, i.e., for powering the loudspeaker 1202 (FIGS. 12A & 12B), to pass therethrough.

Each of the support arms 1302 includes a first end 1308 that is coupled to the mounting plate 1300. And a second, free end 1310 opposite the first end 1308. Each of the support arms 1302 includes a pivot pin 1312 proximal to the free end. Notably, in this configuration, each of the support arms 1302 includes a plurality of locking holes 1314 near its free end 1310.

Figure 14:
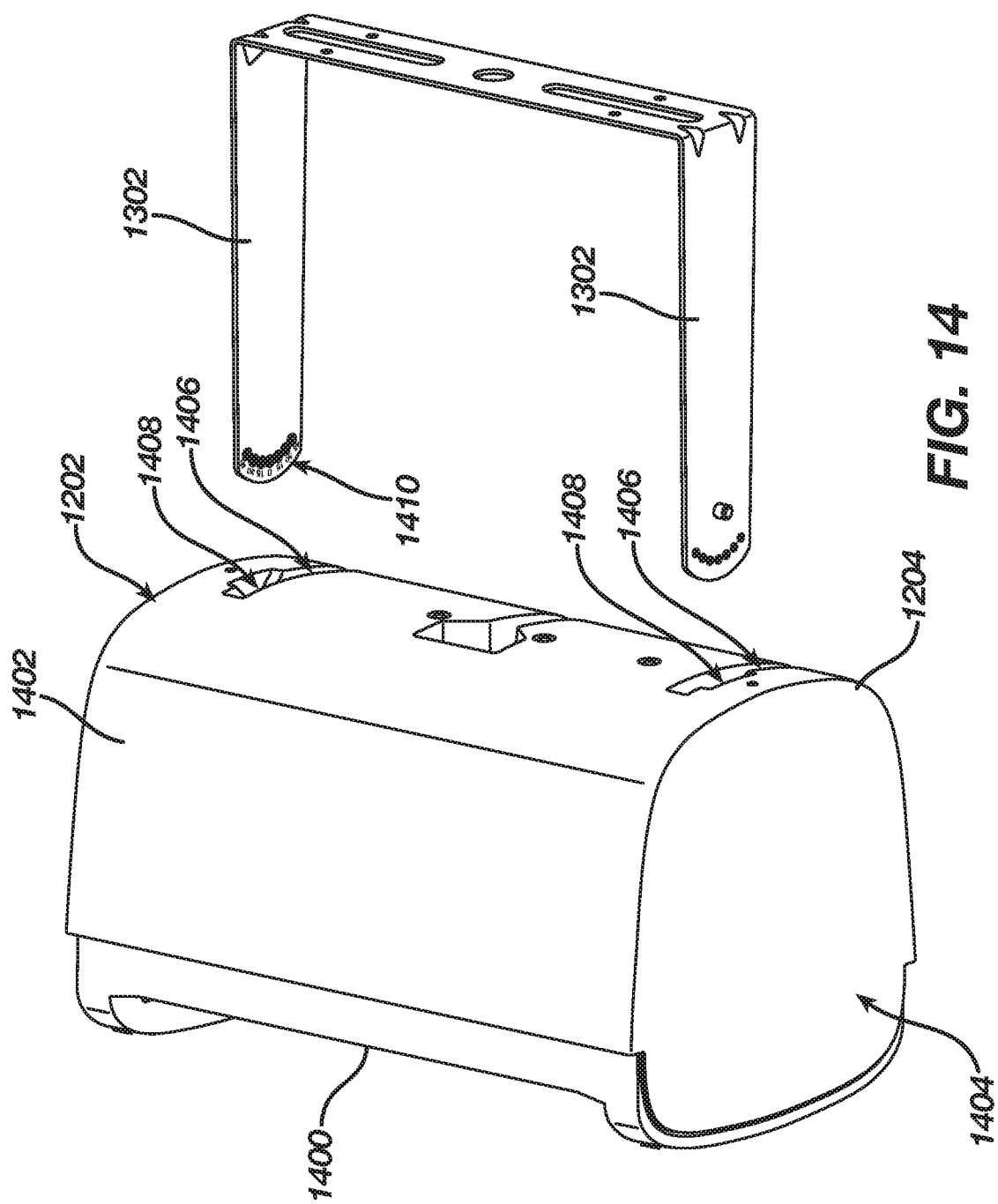
FIG. 14 is an exploded perspective view of the loudspeaker assembly of FIG. 12A as shown from the back, top, and right side.

Referring to FIG. 14, the loudspeaker 1202 includes a baffle 1400 and a back cover 1402 that together define an acoustic enclosure 1404. The back cover 1402 defines a pair of bracket passthroughs 1406 for receiving the support arms 1302. Each of the passthroughs 1406 defines a corresponding pin alignment slot 1408 for accommodating the pivot pins 1312 during insertion of the support arms 1302. As shown in FIG. 14, a visible surface of the support arms 1302 may be embossed with, or have printed thereon, angle markers 1410 to provide the user with a visual indication of the angle of orientation of the loudspeaker 1202.

With reference to FIGS. 15A-15D, each of the pin alignment slots 1408 terminates at a ramp feature 1500, which defines a portion of a pin receptacle 1502 for a corresponding one of the pivot pins 1312. In the illustrated example, the ramp features 1500 are defined by, e.g., integrally molded in, the baffle 1400.

Figure 15A:
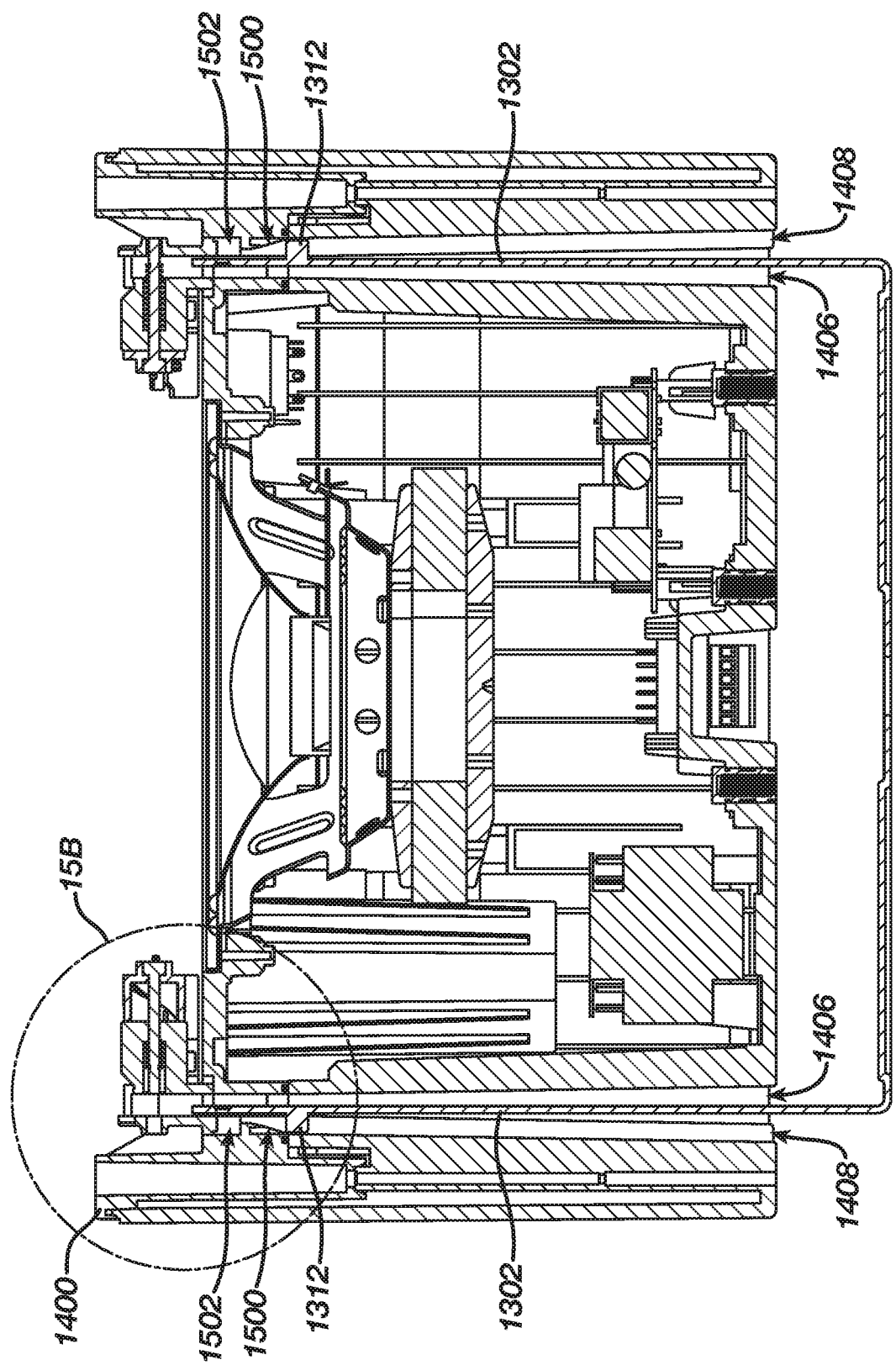
FIG. 15A is cross-sectional top view of the loudspeaker assembly of FIG. 12A showing a pair of support arms of a mounting bracket partially inserted into a pair of bracket passthrough openings defined by the loudspeaker.
Figure 15B:
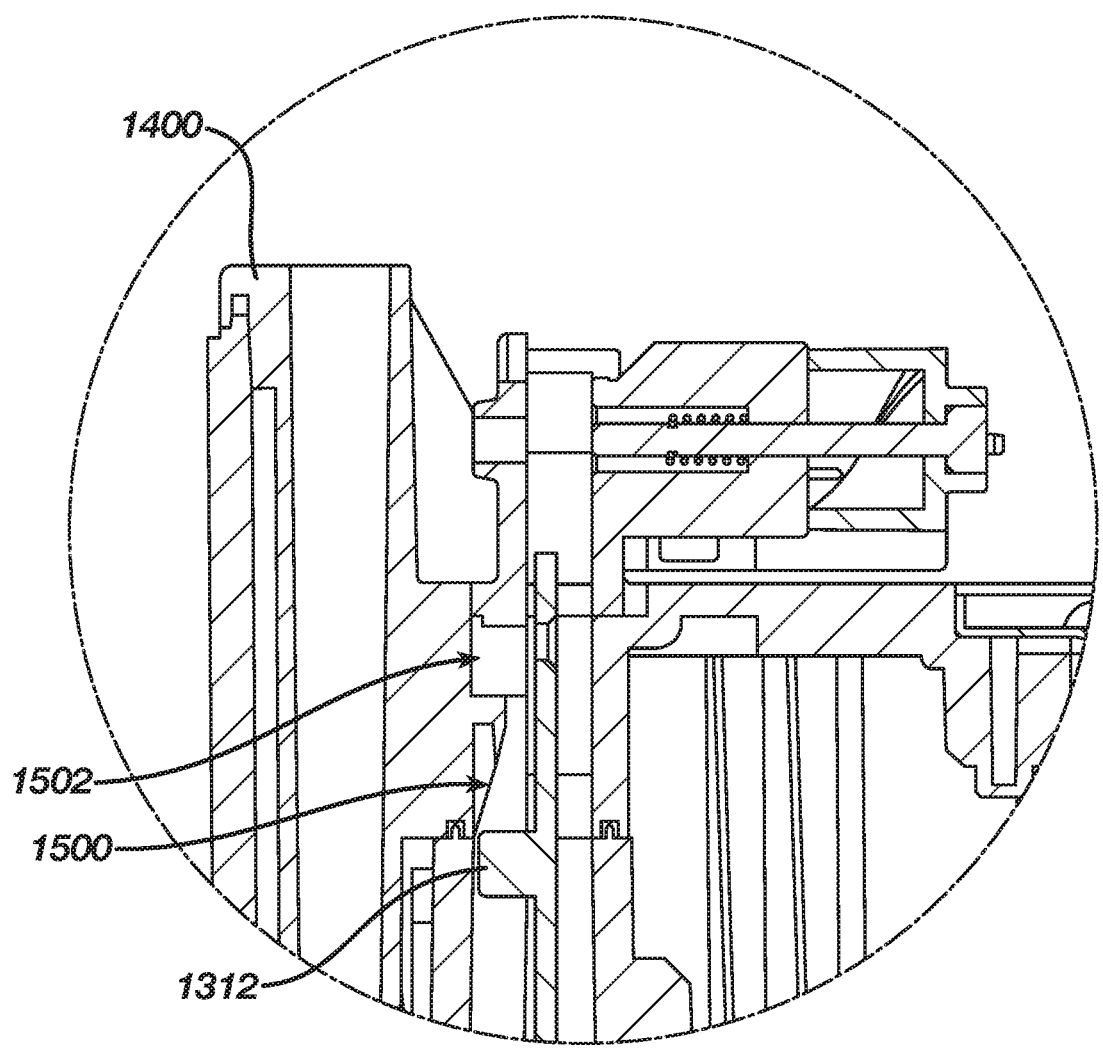
FIG. 15B is a detailed sectional top view from FIG. 15A.
Figure 15C:
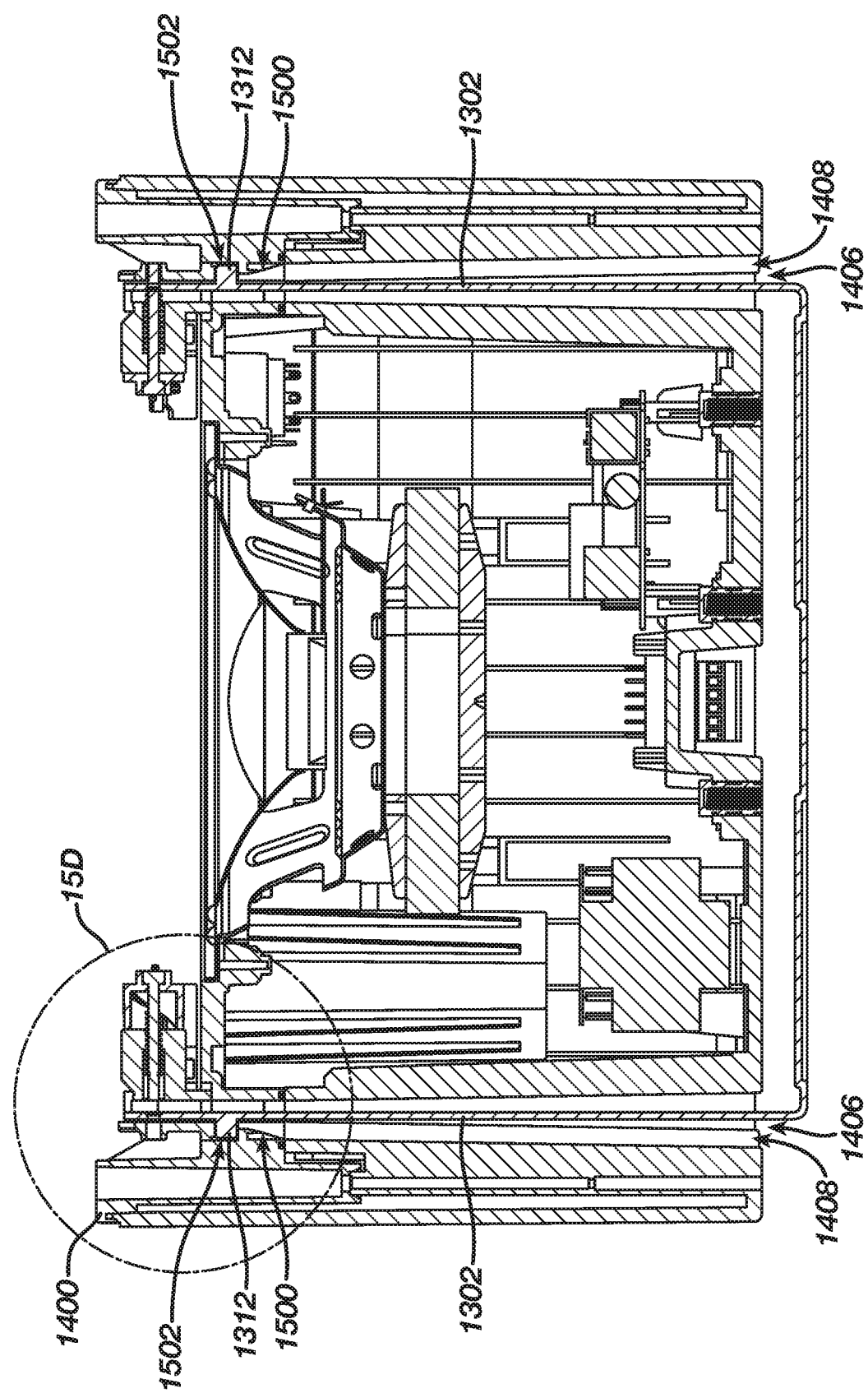
FIG. 15C is cross-sectional top view of the loudspeaker assembly of FIG. 12A showing the pair of support arms of the mounting bracket fully inserted into the pair of bracket passthrough openings defined by the loudspeaker.
Figure 15D:
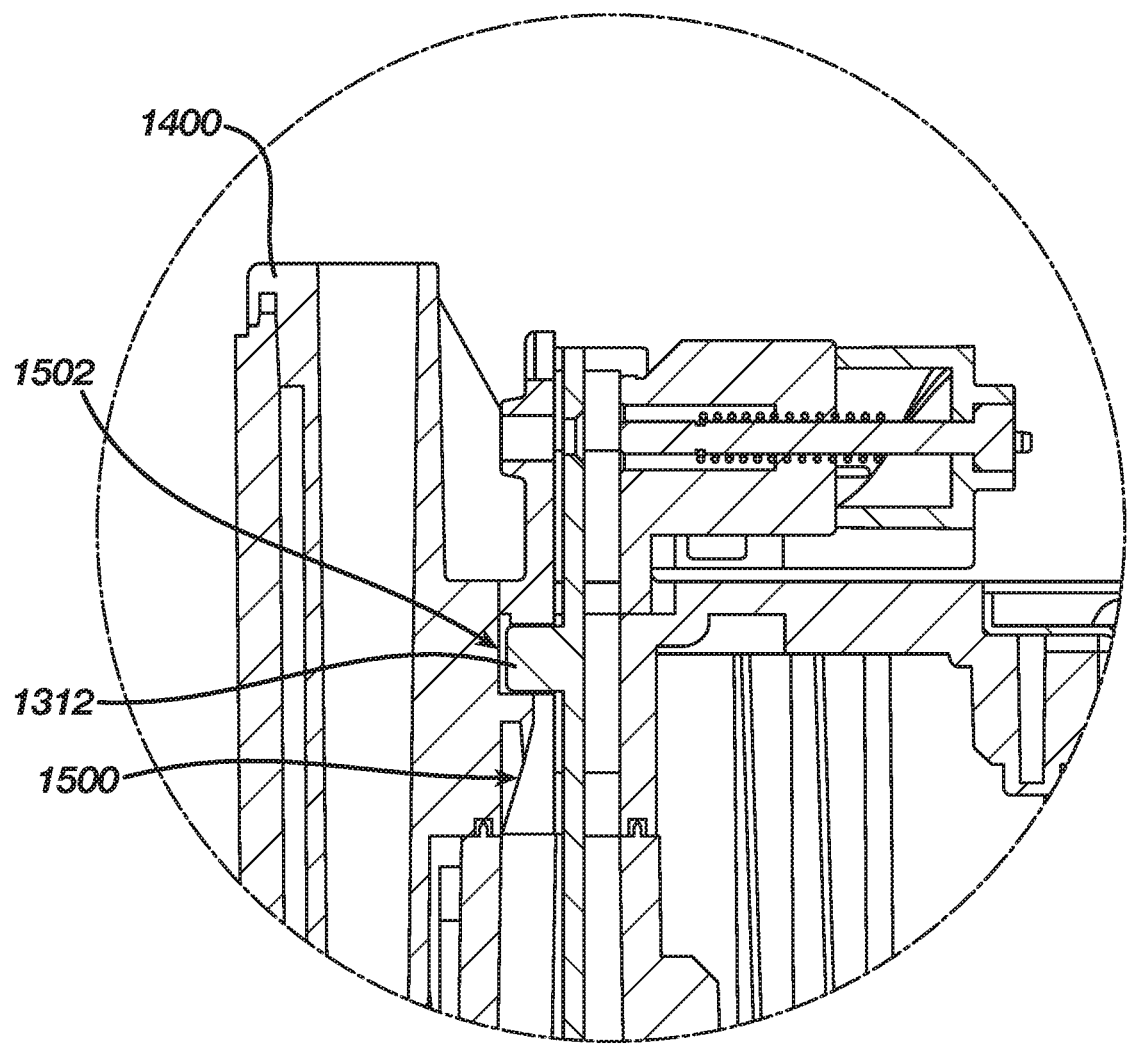
FIG. 15D is a detailed sectional top view from FIG. 15C.

During assembly, the support arms 1302 are inserted in the bracket passthroughs 1406 with their pivot pins 1312 aligned with corresponding ones of the pin alignment slots 1408, as shown in FIGS. 15A & 15B. As the loudspeaker 1202 is moved along the support arms 1302, the pivot pins 1312, guided by the pin alignment slots 1408, will ride up the ramp features 1500 and snap into place in the pin receptacles 1502, as shown in FIGS. 15C & 15D. Once the pivot pins 1312 are engaged in the pin receptacles 1502, the support arms 1302 will be unable to travel any further toward the front surface of baffle 1400. In this position, the support arms 1302 can only be removed from the loudspeaker 1202 by displacing the free ends of the arms 1302 towards each other to disengage the pivot pins 1312 from the pin receptacles 1502.

With the pivot pins 1312 snapped in place in the pin receptacles 1502, the loudspeaker 1202 can pivot about the pivot pins 1312. The range of motion is determined, in part, by the dimension of the bracket passthroughs 1406 (FIG. 14). In the illustrated implementation, the loudspeaker 1202 is rotatable over a 45-degree angle relative to the support arms 1302.

Figure 16:
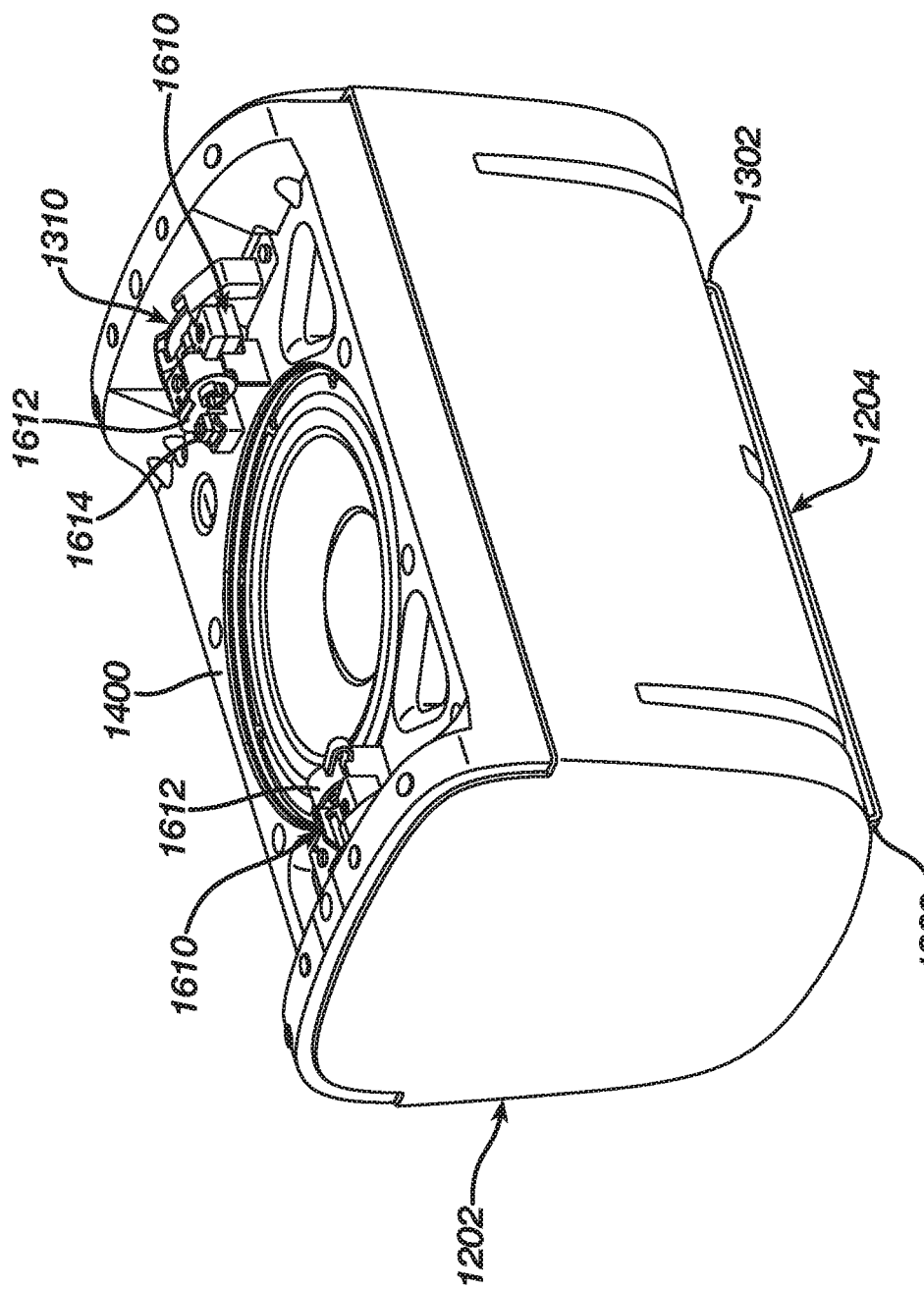
FIG. 16 is a perspective view of the loudspeaker assembly of FIG. 1A with the grille removed.

As shown in FIG. 16, the baffle 1400 defines a pair of openings 1600 within which the ramp features 1500 (FIGS. 15A-15D) are disposed. The openings 1600 accommodate the free ends 1310 (one shown in FIG. 16) of the support arms 1302 and are dimensioned to enable the rotation of the loudspeaker 1202 relative to the mounting bracket 1204.

Figure 17A:
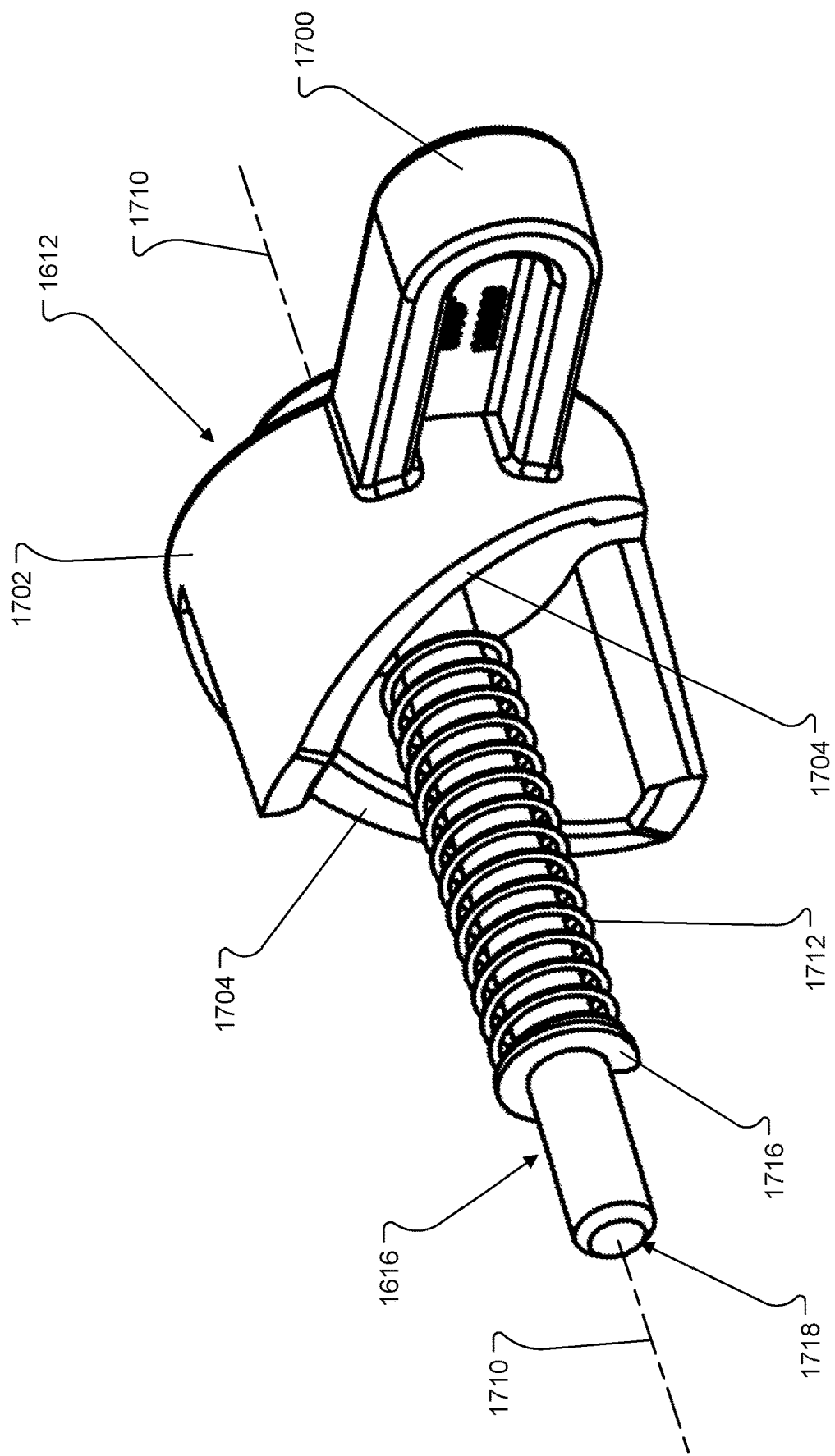
FIG. 17A is a perspective view of a switch and a spring-loaded lock pin from the loudspeaker assembly of FIG. 12A.

With reference to FIG. 16, the loudspeaker 1202 also includes a pair of locking mechanisms 1610. Each locking mechanism 1610 includes a switch 1612, a switch lock 1614 (one shown in FIG. 16), and a spring-loaded lock pin 1616 (FIG. 17A). Once the loudspeaker 1202 is oriented at the desired pitch, the user can actuate the locking mechanism 1610 to hold it in place. The locking mechanisms 1610 will both lock the pitch angle and secure the mounting bracket 1204 in the loudspeaker 1202 by pushing the lock pins 1616 deeper into aligned ones of the locking holes 1314 (FIG. 13).

Figure 17B:
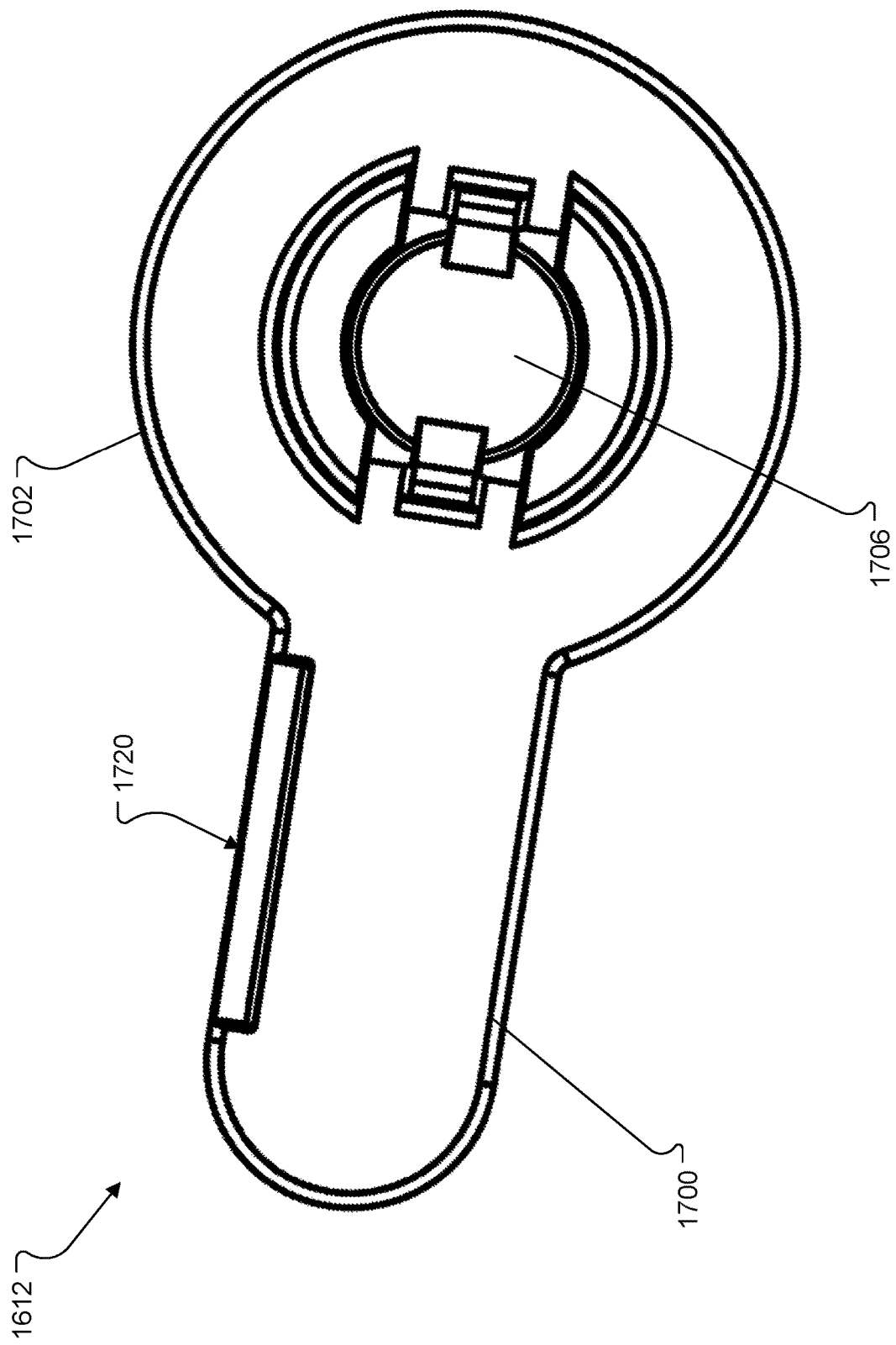
FIG. 17B is a front view of a switch and a spring-loaded lock pin from the loudspeaker assembly of FIG. 12A.

Referring to FIGS. 17A & 17B, each switch 1612 includes a lever 1700 and a pivot body 1702. The pivot body 1702 includes cam surfaces 1704. A first end 1706 (FIG. 17B) of the lock pin 1616 is coupled to the pivot body 1702. A second, free end 1708 (FIG. 17A) of the lock pin 1616 extends outwardly from the pivot body 1702 along a pivot axis 1710 of the pivot body 1702. A compression spring 1712 circumferentially surrounds the lock pin 1616. A first end 1714 of the spring 1712 is coupled to the lock pin 1616 (e.g., via a lock washer 1716). A second end 1718 of the spring 1712 is arranged to engage the switch lock 1614 such that, when assembled, the lock pin 1616 is spring-biased toward the direction of a corresponding one of the support arms 1302.

Figure 18A:
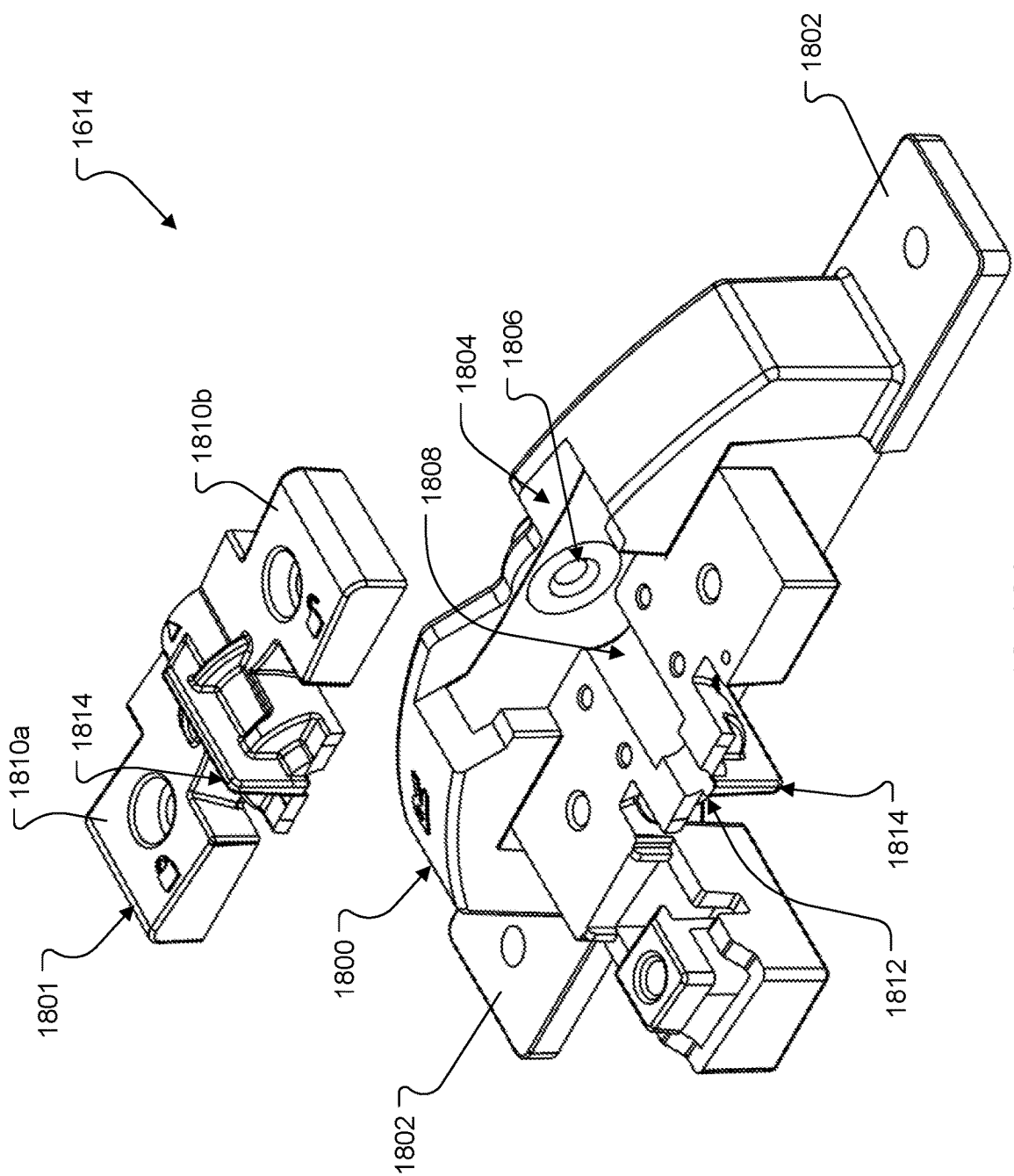
FIG. 18A is an exploded perspective view of a switch lock from the loudspeaker assembly of FIG. 12A.
Figure 18B:
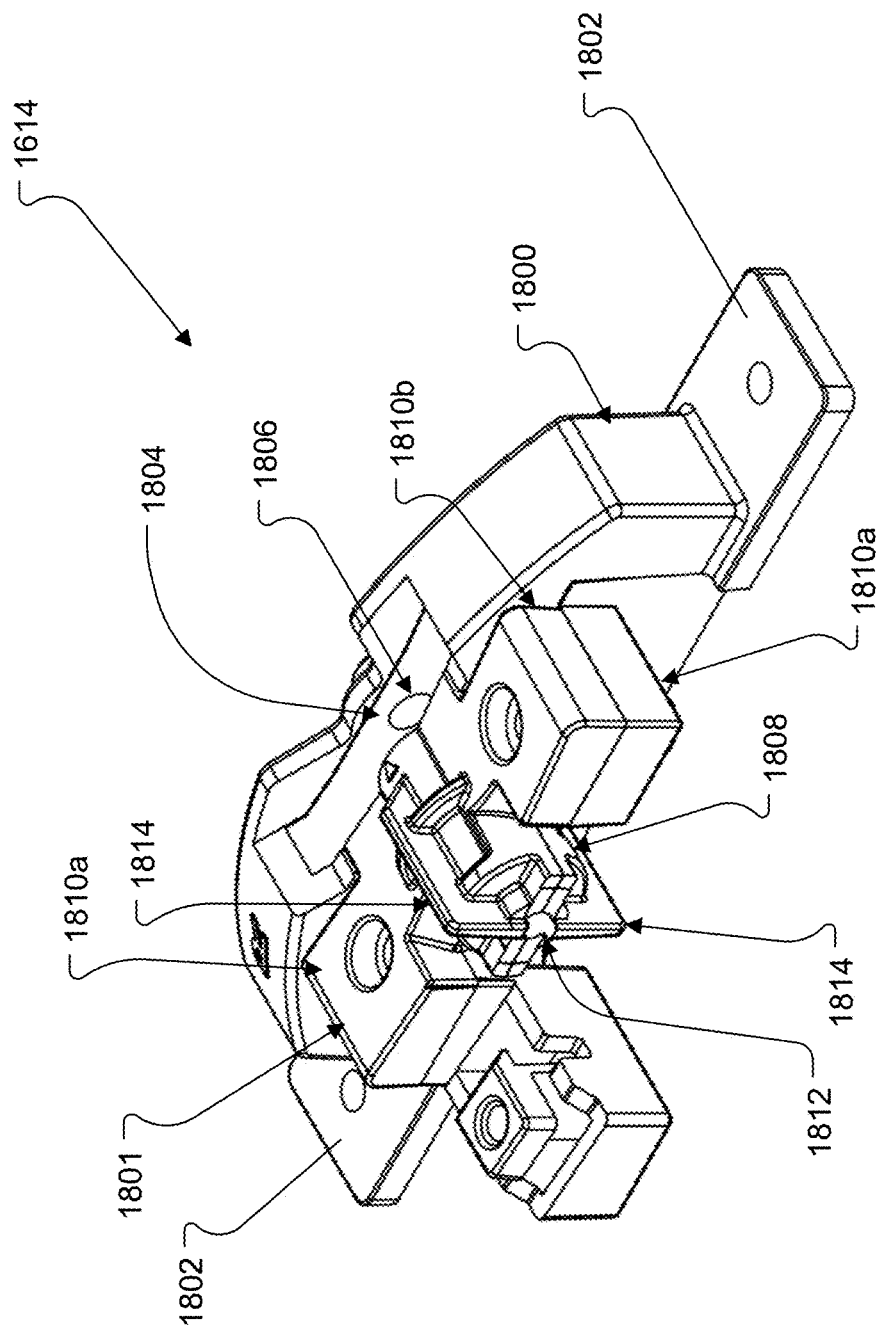
FIG. 18B is a perspective view of a switch lock from the loudspeaker assembly of FIG. 12A.
Figure 19:
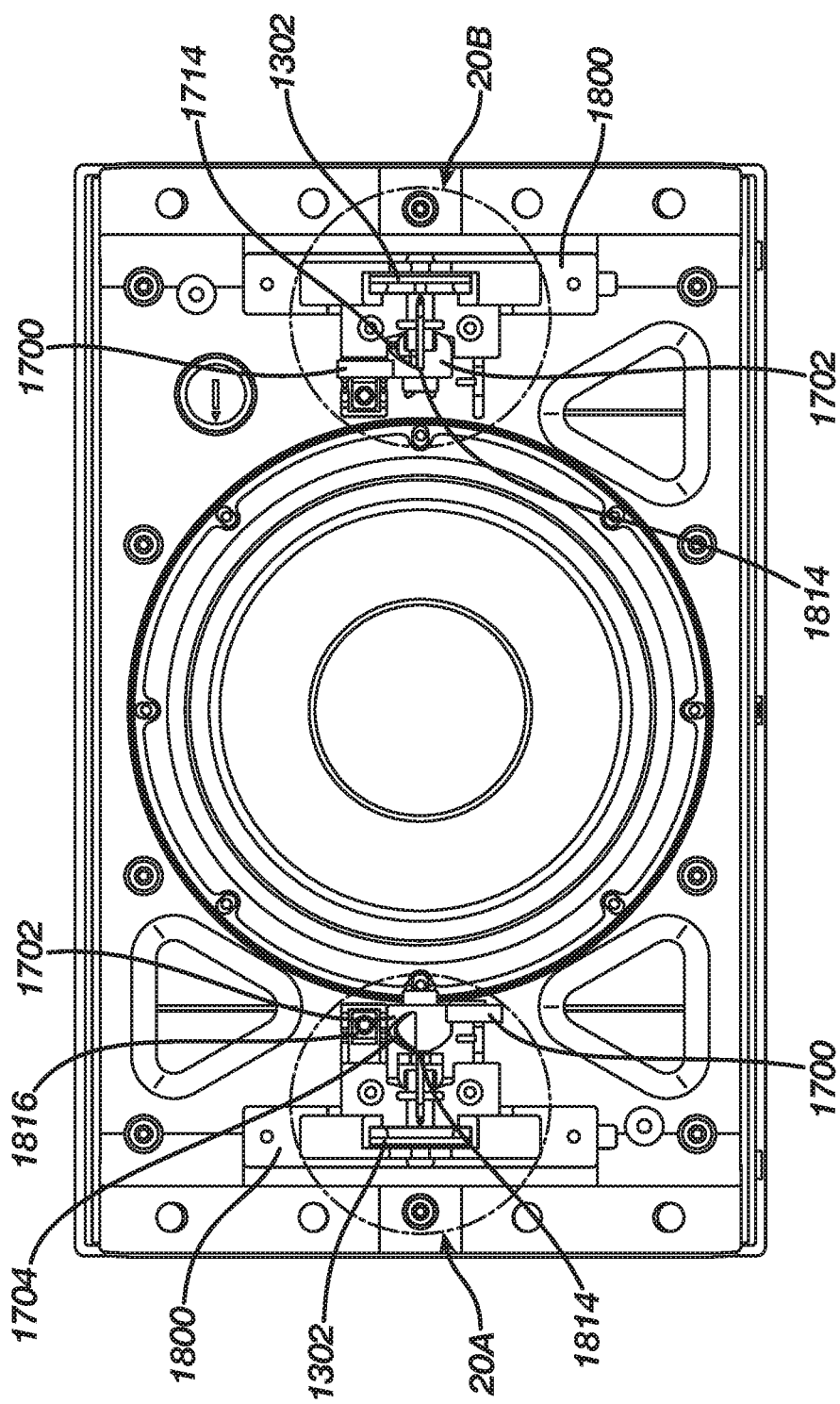
FIG. 19 is a front view of the loudspeaker assembly of FIG. 12A with the grille removed.

With reference to FIGS. 18A & 18B, each of the switch locks 1614 includes a mounting member 1800 and a cover member 1801. The mounting member 1800 includes a pair of mounting tabs 1802 for securing the switch lock 1614 to the baffle 1400. The mounting member 1800 also defines a pocket 1804 for receiving the free end 1310 (FIG. 13) of a corresponding one of the support arms 1302 (FIG. 13). A hole 1806 is provided in the pocket 1804 for accommodating the free end 1708 (FIG. 17A) of a corresponding one of the lock pins 1616 (FIG. 17A). Adjacent the pocket 1804, the mounting member 1800 defines a first portion of a spring retention chamber 1808 (FIG. 18A) for receiving and retaining the compression spring 1712 (FIG. 17A). The cover member 1801 defines a second portion of the spring retention chamber 1808 and is secured to the mounting member 1800, via respective mounting tabs 1810a, 1810b (e.g., with fasteners coupling the mounting tabs), on the mounting member 1800 and the cover member 1801 such that the cover member 1801 and the mounting member 1800 together define the spring retention chamber 1808 and an aperture 1812 for accommodating a corresponding one of the lock pins 1616 (FIG. 17).

The mounting member 1800 and the cover member 1801 also define cam pins 1814 for engaging the cam surfaces 1704 (FIG. 17A) of a corresponding one of the switches 1612 (FIG. 17A). A latch 1816 is coupled to the mounting member 1800 via a spring 1818. The mounting member 1800 and the cover member 1801 may be formed as molded plastic parts.

With reference to FIGS. 19, and 20A through 20D, as the lever 1700 is displaced (e.g., over an angle of 180 degrees) from an unlocked position (FIGS. 20A & 20B) to a locked position (FIGS. 20C & 20D) the pivot body 1702 rotates about its pivot axis 1710. As the pivot body 1702 rotates from the unlocked to the locked position, the cam surface 1704 (FIG. 17A) rides along the tip of the cam pins 1814 (FIG. 18B) and is urged toward the corresponding support arm 1302, and thereby allowing the lock pin 1616 to be displaced, via the biasing force from the compression spring 1712 acting on a rear wall 2000 (FIG. 20B) of the spring retention chamber 1808 and the lock washer 1716, through an aligned one of the lock holes 1314 (FIG. 13) and into the hole 1806 in the mounting member 1800 of the switch lock 1614.

Figure 20A:
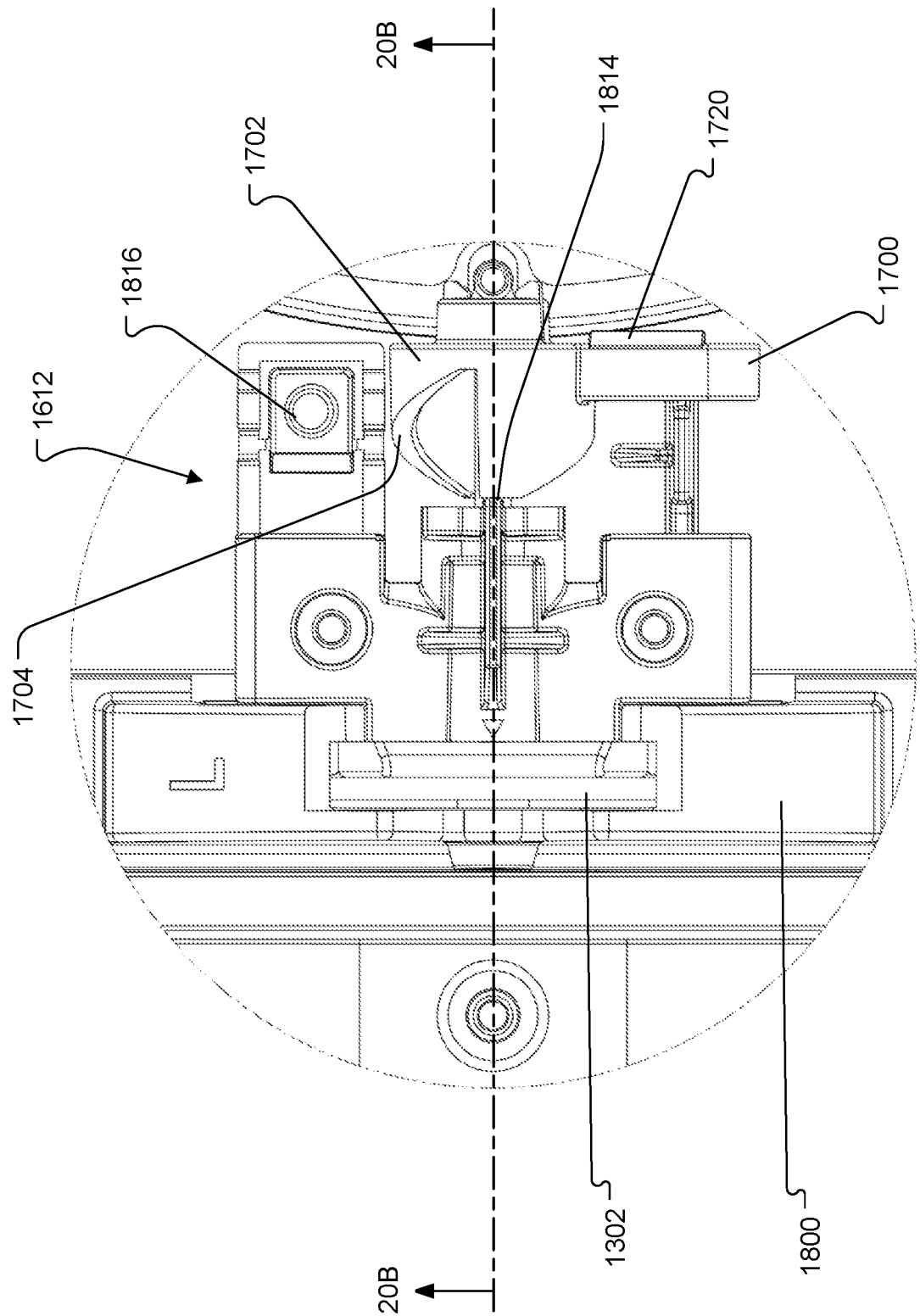
FIG. 20A is a detail view from FIG. 19 showing a first locking mechanism of the loudspeaker assembly in an unlocked position.
Figure 20B:
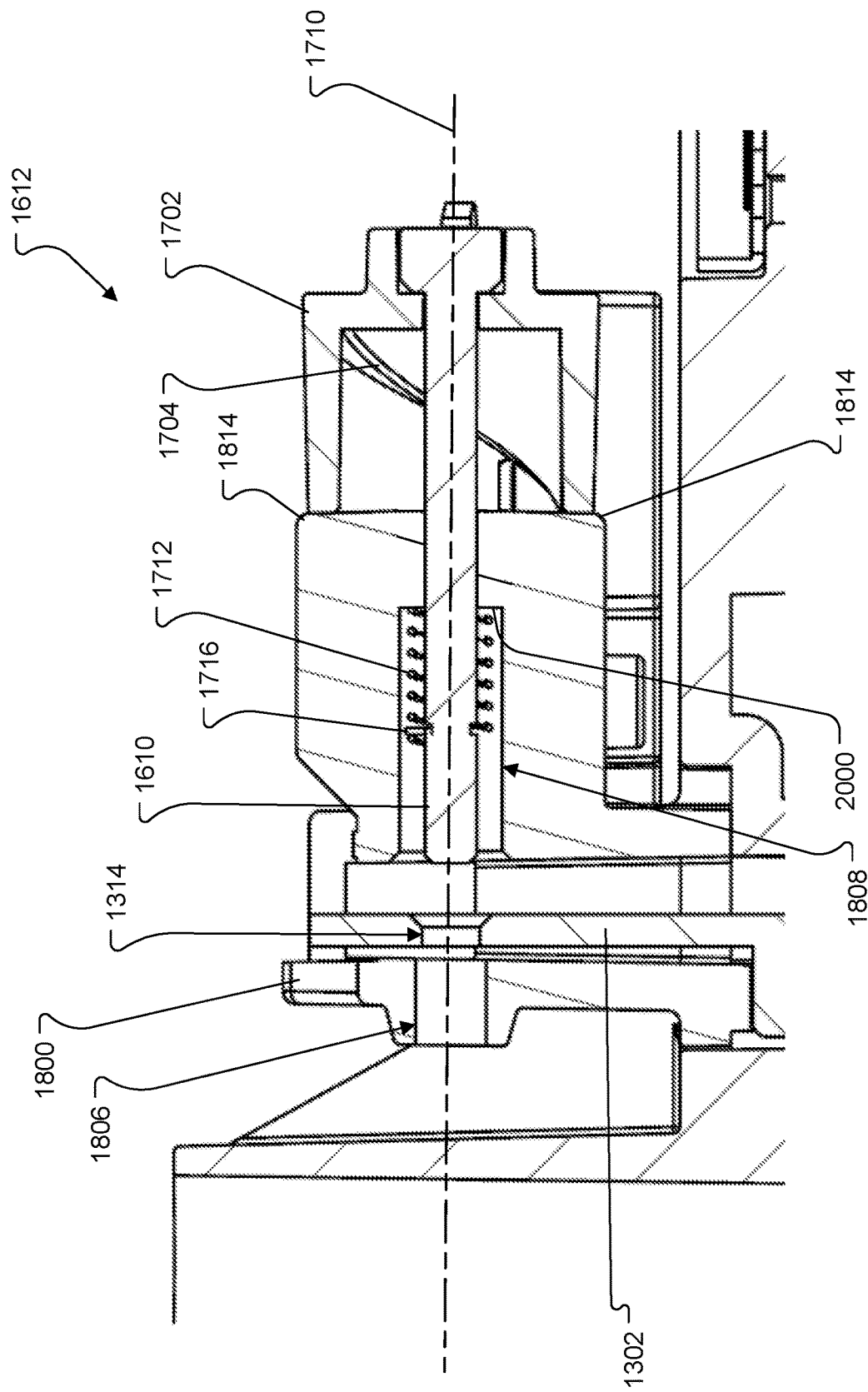
FIG. 20B is cross-sectional view from FIG. 20A.
Figure 20C:
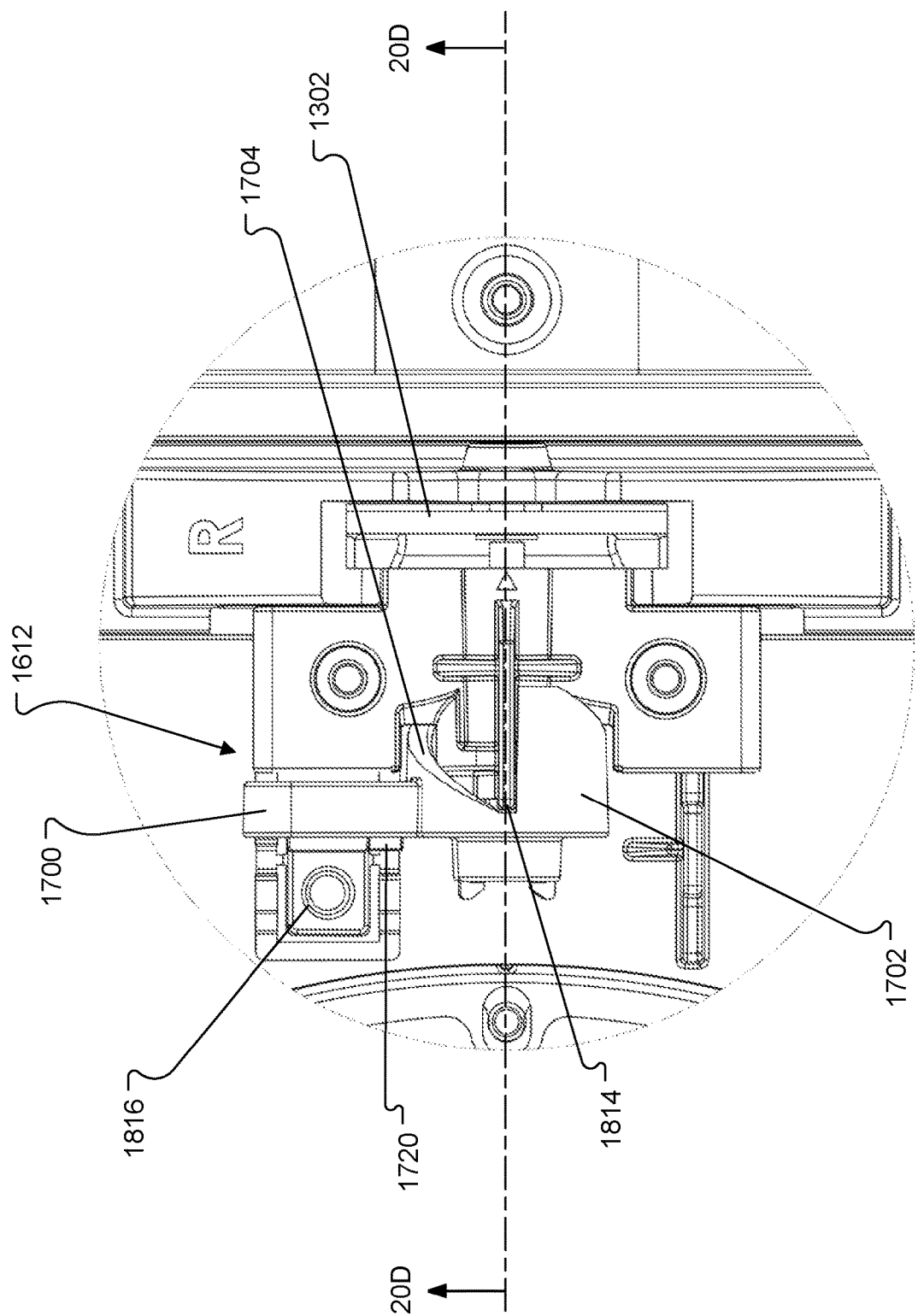
FIG. 20C is a detail view from FIG. 19 showing a second locking mechanism of the loudspeaker assembly in a locked position.
Figure 20D:
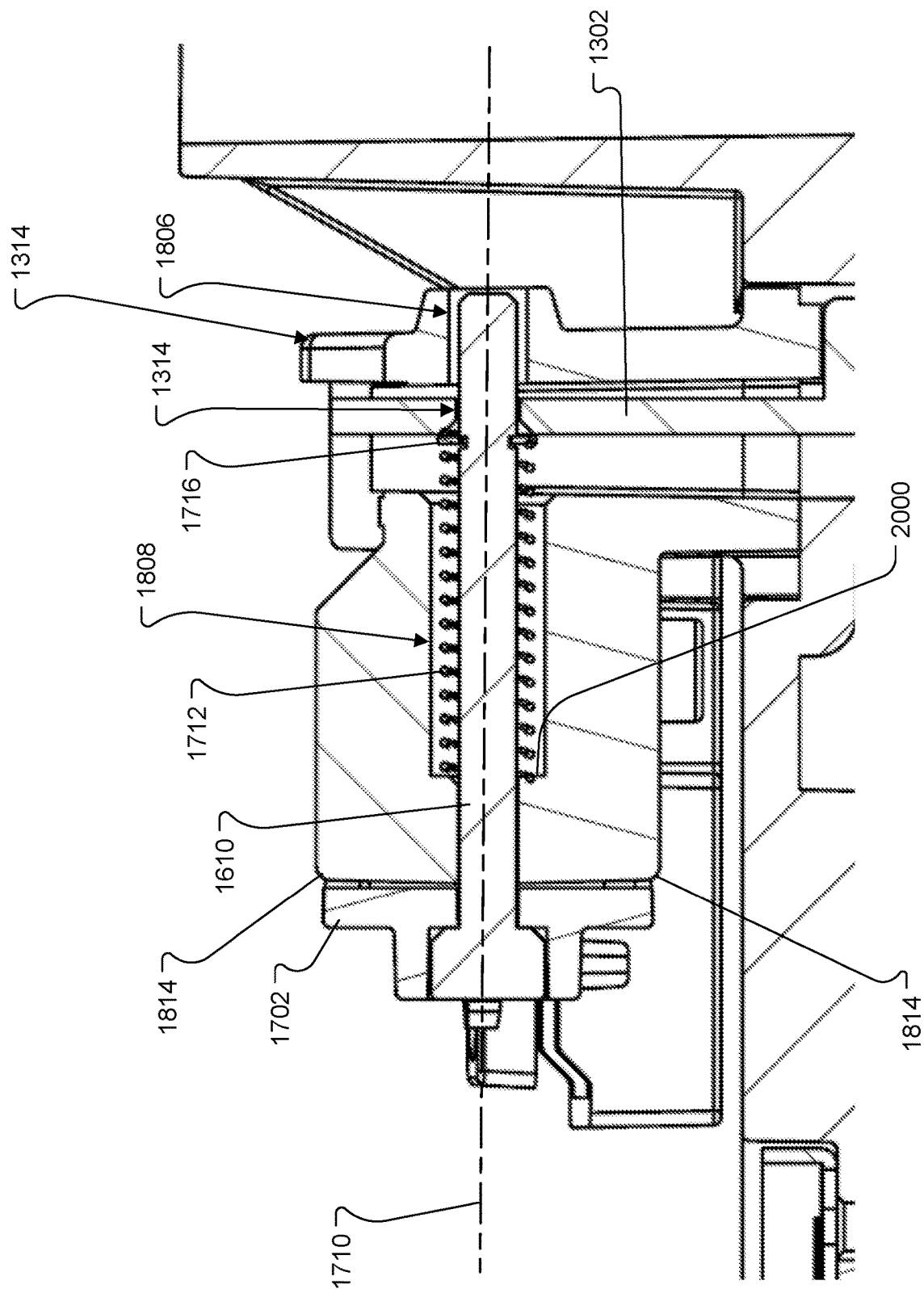
FIG. 20D is cross-sectional view from FIG. 20C.

Once the switch 1612 is in the locked position, the latch 1816 engages a latch edge 1720 (FIG. 17B) to hold the switch 1612 in place. The latch 1816 can be disengaged by manually displacing it away from the latch edge 1720 to allow the lever 1700 to be rotated to the unlocked position (FIGS. 20A & 20B). As the lever 1700 is rotated from the locked position to the unlocked position, the cam surfaces 1704 of the switch 1612 rides along the tips of the cam pins 1814 on the switch lock 1614 causing the lever 1700 to be displaced away from the switch lock 1614, which compresses the compression spring 1712 within the spring retention chamber 1808 and withdraws the lock pin 1616 from the locking hole 1314, thereby allowing the loudspeaker 1202 (FIG. 12) to be adjusted to a different angular position relative to the mounting bracket 1204 (FIG. 12).

Figure 21:
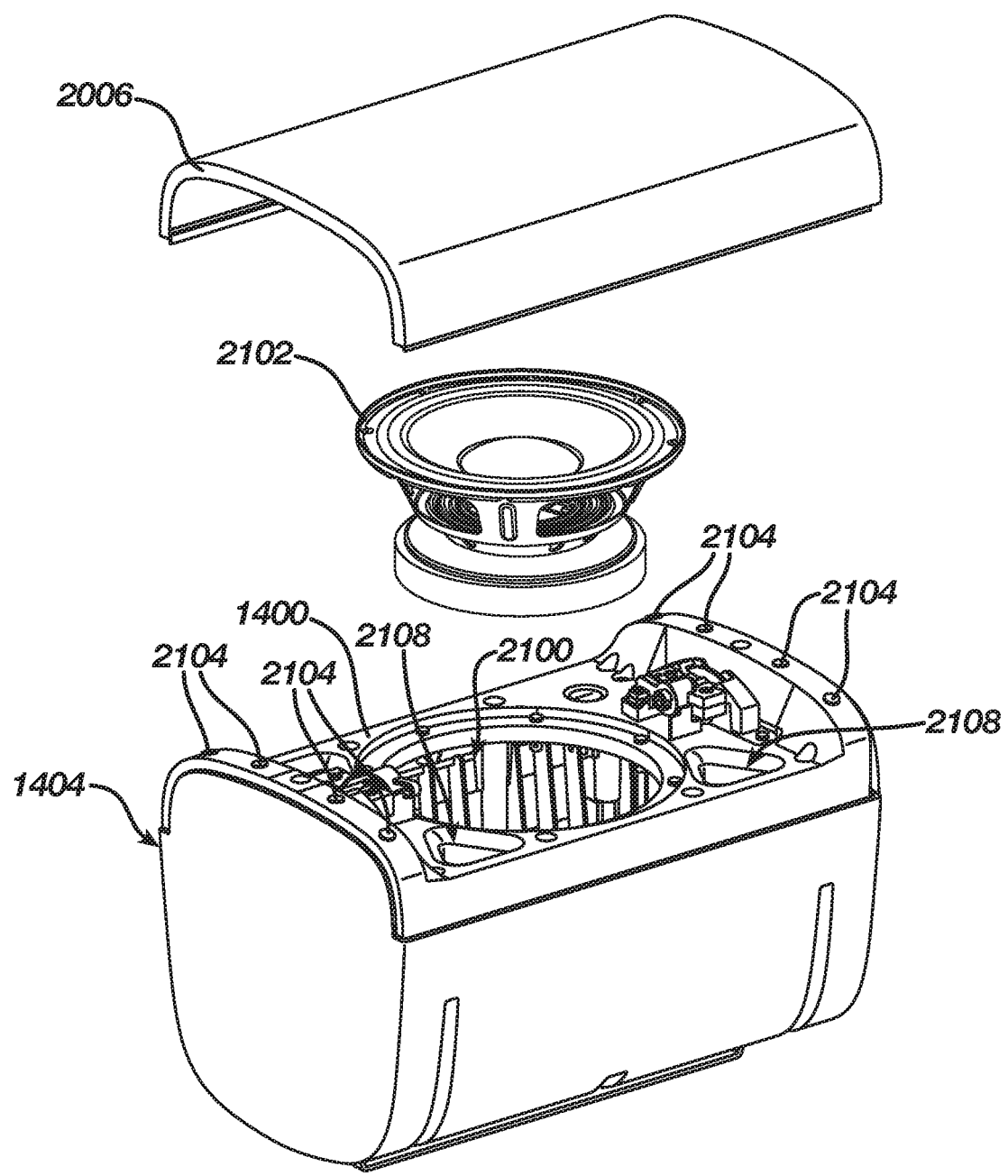
FIG. 21 is an exploded perspective view of the loudspeaker assembly of FIG. 12A showing an electro-acoustic transducer and grille removed from the loudspeaker.

Referring to FIG. 21, the baffle 1400 also defines an aperture 2100 for receiving an electro-acoustic transducer 2102. The electro-acoustic transducer 2102 is mounted to the baffle 1400 such that a rear radiating surface of the transducer radiates acoustic energy into the acoustic enclosure 1404 defined by baffle 1400 and the back cover 1402. A front radiating surface of the electro-acoustic transducer 2102 radiates acoustic energy outwardly, away from the acoustic enclosure 1404.

A plurality of magnets 2104 are disposed along an outer surface of the baffle 1400. The magnets 2104 enable attachment of an acoustically transparent loudspeaker grille 2006. The grille 2006 may be made of metal and/or may be provided with magnets to help enable attachment to the baffle 1400. As shown in FIG. 21, the baffle 1400 may also define a plurality of acoustic ports 2008 that are acoustically coupled to the acoustic enclosure 1404.

While implementations have been described which make use of a rotatable lever for locking and unlocking movement of a loudspeaker relative to a mounting bracket, this could be accomplished by linear motion as well as rotational motion. Overall there are a lot of mechanisms that could be used to lock the pitch using the same lock pin/lock features concept.

A number of implementations have been described. Nevertheless, it will be understood that additional modifications may be made without departing from the scope of the inventive concepts described herein, and, accordingly, other implementations are within the scope of the following claims.

What is claimed is:
1. A loudspeaker assembly, comprising:
 a mounting bracket comprising:
  a mounting plate for securing the mounting bracket to a flat surface; and
  a support arm extending outwardly from the mounting plate; and
  a pivot pin extending outwardly from the support arm; and
 a loudspeaker comprising:
  an electro-acoustic transducer; and
  an acoustic enclosure defining a bracket passthrough for receiving the support arm of the mounting bracket such the loudspeaker is pivotable between a plurality of pitch angles relative to the mounting bracket, wherein the bracket passthrough defines a pin alignment slot for accommodating the pivot pin when the support arm is inserted into the bracket passthrough, and wherein the pin alignment slot terminates at a ramp feature, which defines a portion of a pin receptacle; and
 a locking mechanism for releasably securing the loudspeaker in a selected one of the plurality of pitch angles, wherein the locking mechanism comprises:
  a switch that is displaceable between a first, unlocked position in which the loudspeaker is pivotable relative to the mounting bracket and a second, locked position in which movement of the loudspeaker relative to the mounting bracket is inhibited; and a switch lock that is configured to engage the switch, when the switch is in the locked position, thereby to prevent movement of the switch from the locked position to the unlocked position, wherein at least a portion of the switch lock is displaceable relative to the switch, thereby to disengage the switch lock to permit movement of the switch from the locked position to the unlocked position.

2. The loudspeaker assembly of claim 1, wherein the support arm comprises a pivot pin, and wherein the loudspeaker defines a pin receptacle within the bracket passthrough for receiving the pivot pin such that the loudspeaker pivots, relative to the mounting bracket, about the pivot pin.

3. The loudspeaker of claim 1, wherein the mounting bracket comprises a lock pin extending outwardly from the support arm, wherein the loudspeaker defines an array of lock features, wherein the loudspeaker is rotatable relative to the mounting bracket between the plurality of pitch angles to align different one of the lock features with the lock pin at each one of the plurality of pitch angles.

4. The loudspeaker assembly of claim 3, wherein the locking mechanism is operable to force the lock pin into engagement with a corresponding one of the lock features in the selected one of the pitch angles.

5. The loudspeaker assembly of claim 3, wherein the switch comprises:
a lever; and
a pivot body,
wherein the lever is rotatable about a pivot axis of the pivot body between the unlocked position and the locked position.

6. The loudspeaker assembly of claim 5, wherein the loudspeaker includes a cam pin, and wherein the pivot body comprises a cam surface that rides along the cam pin such that, as the as the lever is rotated from the unlocked position toward the locked position, the switch is urged toward the support arm, and thereby pushes the lock pin into one of the plurality of lock features to secure the loudspeaker in the selected pitch angle.

7. The loudspeaker assembly of claim 6, wherein the loudspeaker further comprises a cam feature; and wherein the switch comprises a second cam surface that is configured to ride along the cam feature such that, as the lever is rotated from the locked position toward the unlocked position, the switch is urged away from the support arm, thereby disengaging the lock pin from one of the plurality of lock features.

8. The loudspeaker assembly of claim 1, wherein the switch includes a latch edge that the switch lock engages to lock the lever in the locked position.

9. The loudspeaker assembly of claim 8, wherein the switch lock comprises a mounting member coupled to the acoustic enclosure, a spring, and a latch coupled to the mounting member via the spring such that the latch is displaceable relative to the acoustic enclosure, and wherein the latch is configured to engage the latch edge of the switch thereby to lock the lever in the locked position.

10. The loudspeaker assembly of claim 9, wherein the latch is displaceable relative to the switch, thereby to disengage the latch edge to permit movement of the lever from the locked position to the unlocked position.

11. The loudspeaker assembly of claim 1, wherein the pivot pin rests in the pin receptacle when the support arm is fully inserted into the bracket passthrough, wherein the loudspeaker is pivotable about the pivot pin when the pivot pin is received within the pin receptacle, and wherein the ramp feature inhibits removal of the support arm from the bracket passthrough once the support arm is fully inserted into the bracket passthrough.

12. The loudspeaker assembly of claim 11, wherein the loudspeaker comprises a baffle and a back cover which together defines the acoustic enclosure,
wherein the back cover defines the bracket passthrough, and
wherein the baffle defines the ramp feature.

13. The loudspeaker assembly of claim 11, wherein the loudspeaker further comprises a yoke which cooperates with the ramp feature to define the pin receptacle.

14. The loudspeaker assembly of claim 13, wherein the mounting bracket comprises a lock pin extending outwardly from the support arm, wherein the yoke defines an array of lock features, and wherein the loudspeaker is rotatable, about the pivot pin and relative to the mounting bracket, between the plurality of pitch angles to align different one of the lock features with the lock pin at each one of the plurality of pitch angles.

15. The loudspeaker assembly of claim 1, wherein the loudspeaker comprises a baffle and a back cover which together defines the acoustic enclosure.

16. The loudspeaker assembly of claim 15, wherein the back cover defines the bracket passthrough.

17. The loudspeaker assembly of claim 15, wherein the baffle defines an aperture for receiving and supporting the electro-acoustic transducer.

18. The loudspeaker assembly of claim 15, wherein the loudspeaker further comprises an acoustically transparent grille, and
wherein the baffle includes a magnet for coupling the baffle to the grille.

19. The loudspeaker of claim 1, wherein the locking mechanism comprises a lock pin or surface, wherein the mounting bracket defines an array of lock features, wherein the loudspeaker is rotatable relative to the mounting bracket between the plurality of pitch angles to align different ones of the lock features with the lock pin or surface at each one of the plurality of pitch angles, and wherein the locking mechanism is operable to displace the lock pin to engage an aligned one of the lock features, thereby to lock the loudspeaker in one of the plurality of pitch angles.

20. The loudspeaker assembly of claim 19, wherein the locking mechanism includes a switch comprising:
a lever; and
a pivot body,
wherein the lever is rotatable about a pivot axis of the pivot body between a first, unlocked position in which the loudspeaker is pivotable relative to the mounting bracket and a second, locked position in which movement of the loudspeaker relative to the mounting bracket is inhibited.

21. The loudspeaker assembly of claim 1, wherein the locking mechanism includes a switch comprising:
a displaceable member, wherein the displaceable member is displaceable between a first, unlocked position in which the loudspeaker is pivotable relative to the mounting bracket and a second, locked position in which movement of the loudspeaker relative to the mounting bracket is inhibited.

22. A method comprising:
securing a mounting bracket to a surface;
inserting a support arm of the mounting bracket into a bracket passthrough opening defined by an acoustic enclosure of a loudspeaker, wherein inserting the support arm comprises causing a pivot pin on the support arm to engage a pin receptacle that includes a ramp feature defined by the loudspeaker;

rotating the loudspeaker relative to the support arm to a selected one of a plurality of pitch angles; and engaging a locking mechanism to releasably secure the loudspeaker in the selected one of the plurality of pitch angles, wherein engaging the locking mechanism comprises rotating a lever to cause a lock pin on the support arm to engage one of an array of lock features defined by the loudspeaker.

23. The method of claim 22, wherein engaging the locking mechanism further comprises rotating the lever to a lock position and thereby causing a latch to engage a latch edge on the lever, thereby inhibiting further movement of the lever.

24. The method of claim 22, wherein engaging the locking mechanism comprises displacing a displaceable member to cause a lock pin on the support arm or loudspeaker to engage one of an array of lock features defined by the loudspeaker or support arm.

25. A method comprising:

displacing a pair of displaceable members affixed to an acoustic enclosure of a loudspeaker from respective locked positions to respective unlocked positions;

displacing distal ends of support arms of a mounting bracket towards each other, thereby to disengage a pair of pivot pins on the support arms from respective ones of a pair of pin receptacles, each of which includes a ramp feature, defined by the loudspeaker; and sliding the loudspeaker away from the mounting bracket along the support arms and thereby decoupling the loudspeaker from the mounting bracket.

* * * * *